Aug. 2, 1960          C. H. KILLIAN                    2,947,928
                    AUTOMATIC MACHINIST
Original Filed May 18, 1943                        10 Sheets-Sheet 1
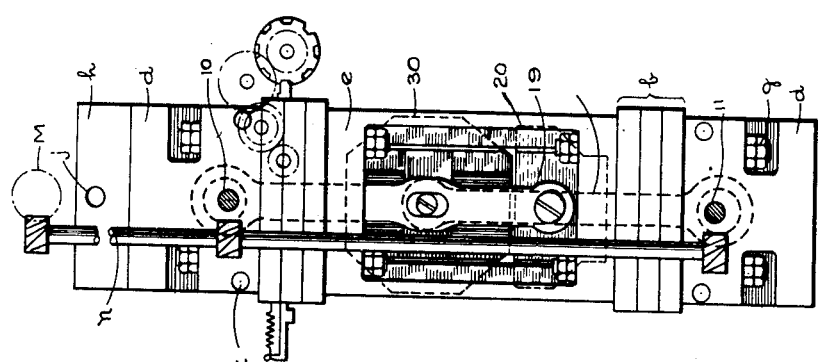
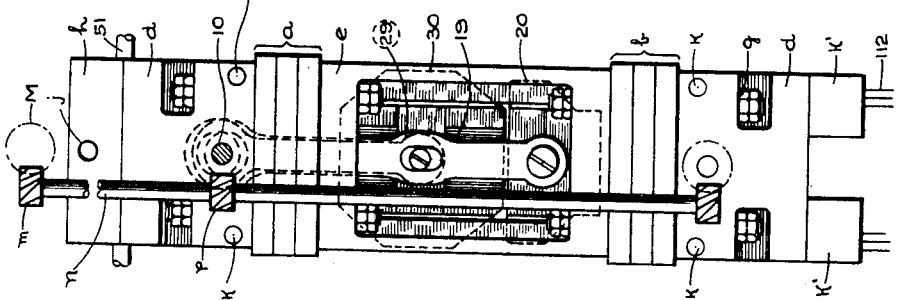
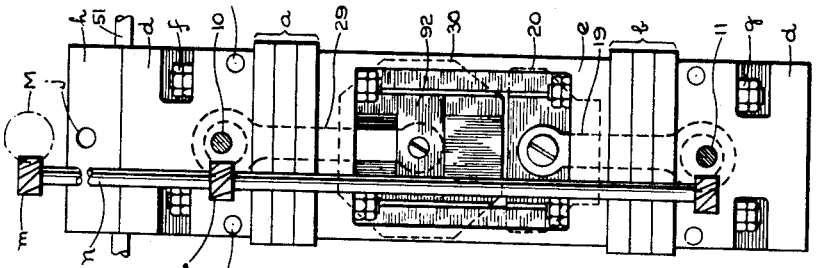
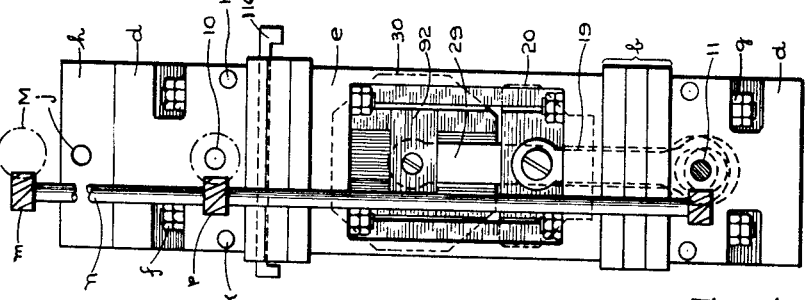
Cletus H Killian
INVENTOR
By Harris D Hineline
Attorney Aug. 2, 1960 C. H. KILLIAN 2,947,928
AUTOMATIC MACHINIST
Original Filed May 18, 1943 10 Sheets-Sheet 2
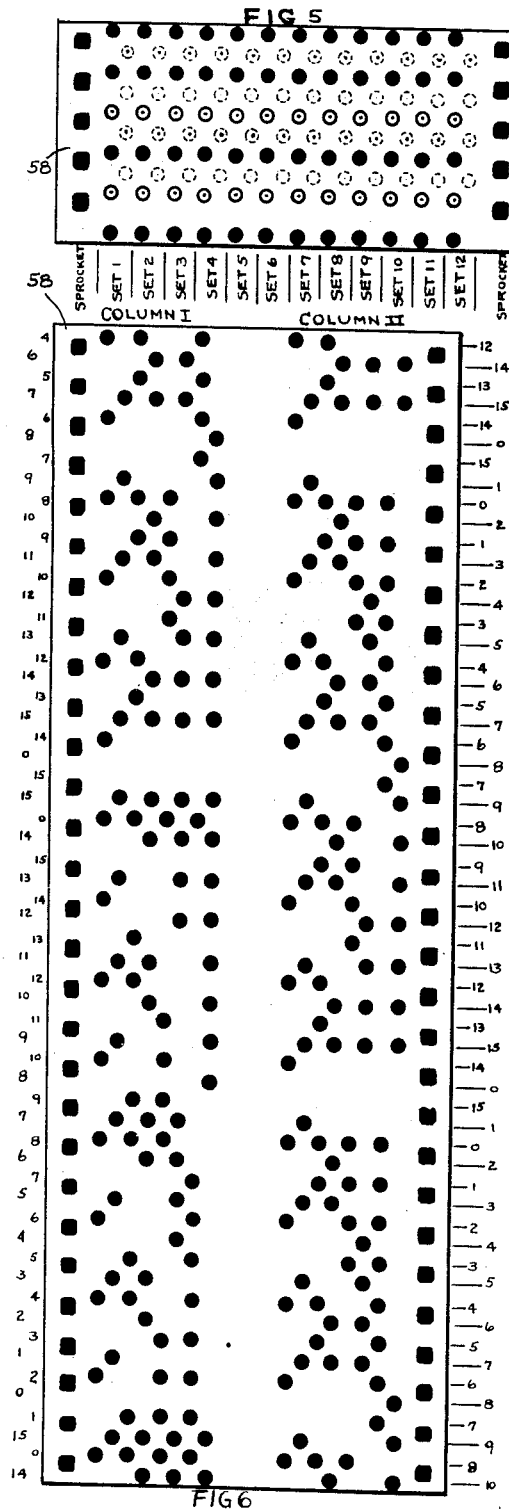
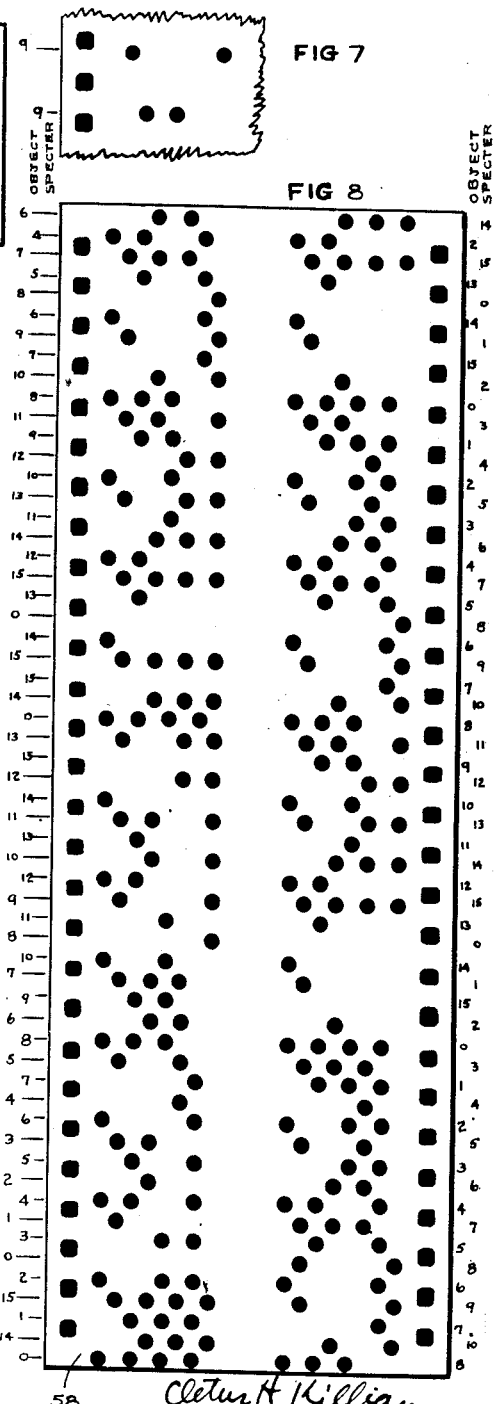
INVENTOR
Cletus H Killian
By Harris D Hineline
attorney Aug. 2, 1960

C. H. KILLIAN 2,947,928

AUTOMATIC MACHINIST

Original Filed May 18, 1943

Aug. 2, 1960  C. H. KILLIAN  2,947,928
AUTOMATIC MACHINIST
Original Filed May 18, 1943  10 Sheets-Sheet 4

INVENTOR
ATTORNEY

Aug. 2, 1960  C. H. KILLIAN  2,947,928
AUTOMATIC MACHINIST
Original Filed May 18, 1943  10 Sheets-Sheet 5
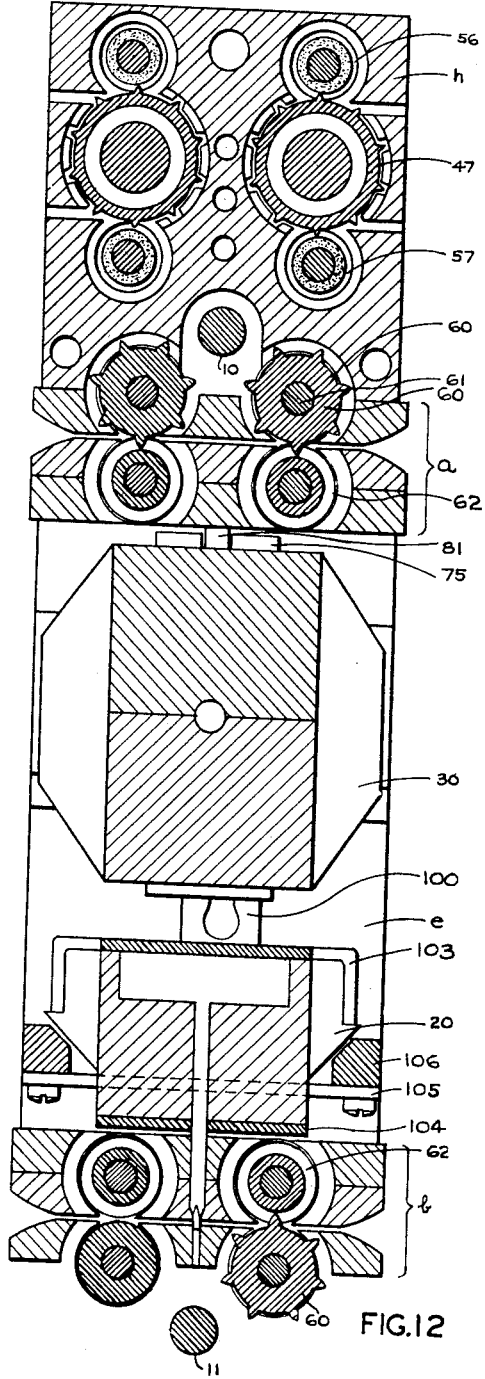
FIG.12
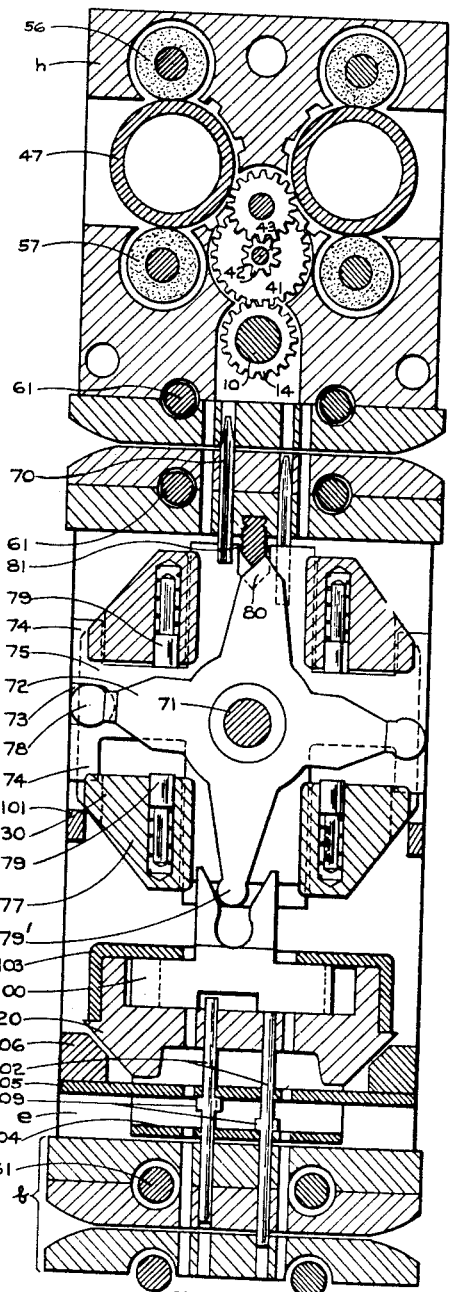
FIG.13
INVENTOR
By Harris D Hindin
attorney Aug. 2, 1960     C. H. KILLIAN     2,947,928
AUTOMATIC MACHINIST Original Filed May 18, 1943     10 Sheets-Sheet 6

Aug. 2, 1960  C. H. KILLIAN  2,947,928
AUTOMATIC MACHINIST
Original Filed May 18, 1943  10 Sheets-Sheet 7

INVENTOR

Aug. 2, 1960     C. H. KILLIAN     2,947,928
AUTOMATIC MACHINIST
Original Filed May 18, 1943     10 Sheets-Sheet 8

Cletus H Killian
INVENTOR
By Harris D Huneline
Attorney

Aug. 2, 1960

C. H. KILLIAN 2,947,928

AUTOMATIC MACHINIST

Original Filed May 18, 1943

Cleton H Killian
INVENTOR

By Harris D Hineline
Attorney

United States Patent Office 2,947,928
Patented Aug. 2, 1960

2,947,928

AUTOMATIC MACHINIST

Cletus H. Killian, Brooklyn, N.Y., assignor of one-fourth to R. K. Le Blond Machine Tool Co., Cincinnati, Ohio, a corporation of Delaware Substituted for abandoned application Ser. No. 487,443, May 18, 1943. This application Oct. 7, 1952, Ser. No. 313,536

9 Claims. (Cl. 318—23)

This application is a substitute for my abandoned application, Serial Number 487,443, filed May 18, 1943.

My invention relates to improvements in the process and/or methods of automatically controlling various instrumentalities such as various machine tools, as for example lathes, milling machines, saws, planers, shapers, profilers, etc., or of other devices having optionally adjustable means under control of an operator as for example chemical reaction devices, various paper machines (Yankee, Fourdriniers, etc.), molding machines of various sorts, furnaces, textile machines or the like. This invention is an improvement in part, and a continuation in part of my prior applications for patent, Serial Number 248,062, filed August 23, 1951, Serial Number 20,018, filed May 6, 1935; Serial Number 481,940, filed April 5, 1943; and Serial Number 74,327, filed April 14, 1936, now all abandoned, for this invention in common with the inventions in cited applications for patent comprises both perforated tape sensing mechanisms and tape punching mechanisms as well as other devices to be controlled thereby.

The fundamental principles of this invention have been fully disclosed in certain of the inventor's co-pending applications. The functioning of a machine tool in accordance with a predetermined schedule has been set forth in the application of C. H. Killian, Serial Number 74,327, filed April 14, 1936, for Method and Process for Die Sinking, now abandoned. The description of the component parts of the control mechanism has been fully set out in the application of C. H. Killian, Serial Number 20,018, filed May 6, 1935, for Kalkulex Systems, now abandoned. A further development of the latter appears in the application of C. H. Killian, Serial Number 481,940, filed April 5, 1943, for Kalkulex Systems, now abandoned. The inventions disclosed herein are improvements, in part, and continuations, in part, of the cited applications for patents.

The mechanism to be described has been constructed and has been inexperimental use for some time in cutting irregular contours by automatically controlling the work feeding elements of a profiling machine. This experimental work included the construction of arbitrary irregular contours corresponding to shapes required for small arms, contour templates required for shaping and gauging airplane parts such as propellers, etc. Experience has clearly demonstrated that surprisingly exact duplications can be readily obtained, that a perforated tape corresponring to an irregular template or contour can be constructed ab initio, or duplicated in a time that is negligible in comparison with the usual procedure. One spectacular result includes the shaping or fashioning of complex parts at a single "set up" on one machine tool by the use of an appropriate perforated tape which corresponds to the part to be fashioned.

This invention relates to improvements in automatic controls for machinery in general, but, more specifically, it is shown and described in connection with a machine tool. The broad aspects of this invention are adaptable to any machine having optionally adjustable controls. Thus, the usual lathe is provided with the so-called "lead screw" for moving the carriage along the bed; the lathe carriage is also provided with a "feed screw" for adjusting the tool bit towards, or away from, the lathe centers. Again, most milling machines are provided with feeds for transversing the table, for elevating the table, for cross feeding the table, etc. It is well known that such machines sometimes have rack and pinion feeds rather than screw feeds; nevertheless, the mechanisms of the present invention are applicable thereto. It is also well known that other machines have such adjustable elements—as for example, some printing presses, some reaction vessels in the process industries, some gauging machines, etc. It is to be understood that the mechanisms fully disclosed and described herein can often be applied to such devices as occasion may arise.

One object of the present invention is to convert a relatively simple manually controlled machine into a more or less fully automatic machine—as for example, a hand controlled milling machine may be converted into a fully automatic milling machine; a hand controlled lathe may be converted into a more or less completely automatic lathe; a hand operated profiler may be converted into an automatic profiler; a manually controlled reaction vessel (e.g., tire vulcanizer, digester, etc.) may be converted into a fully automatic device; etc.

Another object of this invention is to cause a suitable machine to pass through a given number of repetitive cycles under control of a master, which is usually in the form of a perforated tape.

Another object of this invention is to automatically guide, or control, the relative motion of a cutting tool, and the work operated upon through the agency of a suitable perforated tape.

Another object of this invention is to automatically manipulate certain adjustments of a suitable machine, which are ordinarily operated by hand or by semi-automatic means, thereby producing a fully automatic device.

Fig. 1 is a diagrammatic end view of a manual punch.

Fig. 2 is a diagrammatic end view of a duplicating punch.

Fig. 3 is a diagrammatic end view of a tape senser.

Fig. 4 is a diagrammatic end view of a counting punch.

Fig. 5 is a schematic view of a fragment of a blank tape showing the location of each and every possible perforation and a graphic classification of the possible perforations.

Fig. 6 is a view of a tape fragment showing a series of perforations that occasionally appear in actual operation of the machinery described herein showing an interpretation of certain of the perforations.

Fig. 7 is a detached fragment of Fig. 6 showing only four perforations and an interpretation thereof.

Fig. 8 is a view of a tape fragment showing a modified arrangement of perforations, and, for the sake of clearness, the modified form contains practically the same information as that of the tape fragment of Fig. 6.

Fig. 12 is a sectional view of a duplicating punch showing the tape feeding sprockets, presser rolls, etc.

Fig. 13 is a sectional view of a duplicating punch corresponding to a typical section through approximately the middle of the machine.

ARRANGEMENT OF KALKULEX UNITS

Figure 9:
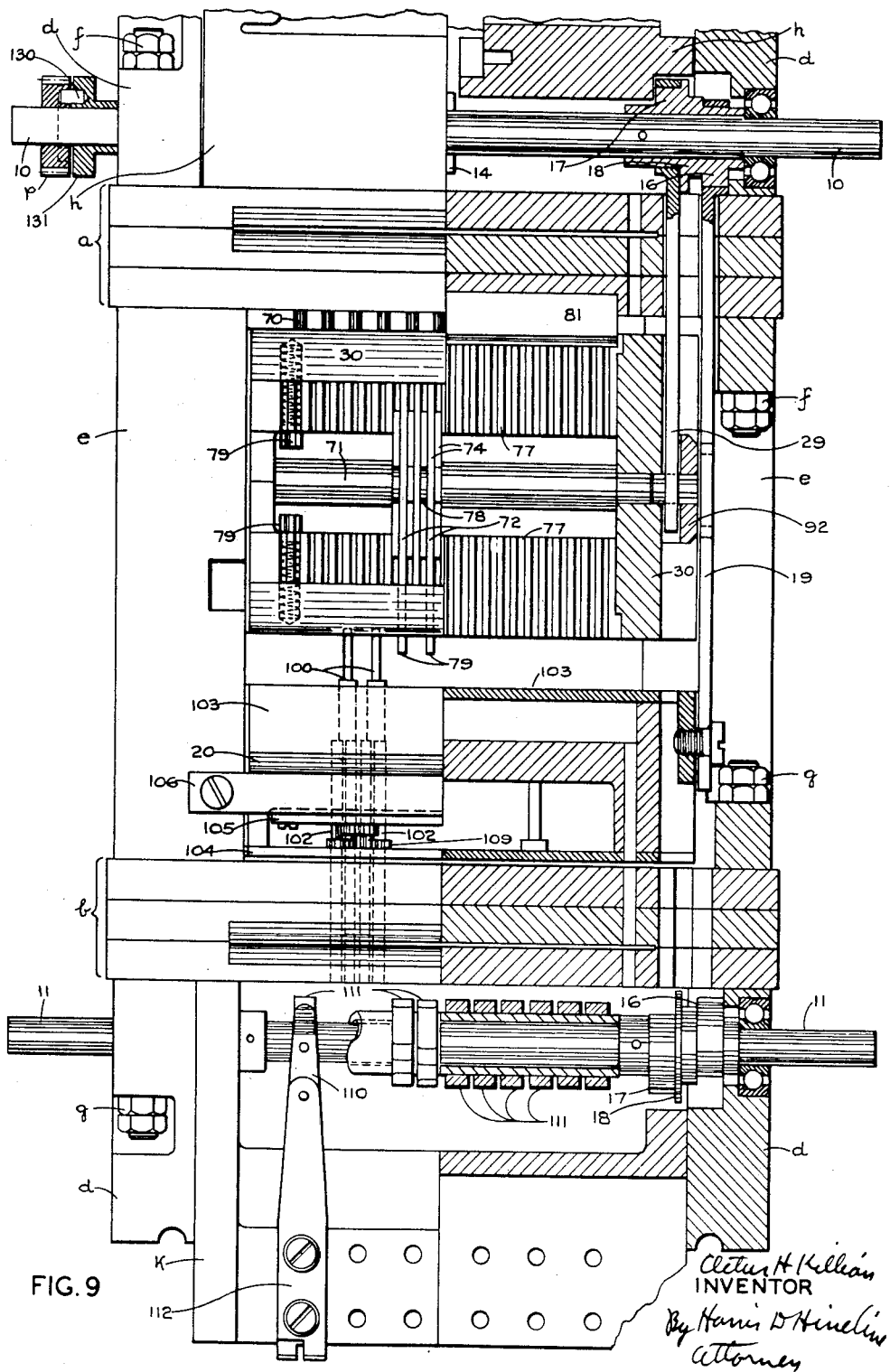
Fig. 9 is a combined side view and mid-section of a senser with some parts omitted for the sake of clarity.

It has been pointed out in the cited applications for patent that a Kalkulex machine can be constructed of compatible Kalkulex units tailored to fit into a particular application of the routine to be practiced. In general, the separate Kalkulex units can be viewed as an assortment of "standard fittings" which can be assembled into a complete machine by a process of assembly simulating that of erecting prefabricated dwellings, prefabricated ships, prefabricated furniture, etc. A few representative assemblies are shown diagrammatically in Figs. 1, 2, 3, and 4. In these diagrammatic representations, Fig. 3 may be called a senser for it is an assemblage of Kalkulex units primarily adapted to sense the perforations in a perforated tape, then to convert the said perforations into mechanical displacements symorphic with the said perforations, then to close and open prearranged groups of switches for transforming the mechanical displacements into electric currents to correspondingly operate a very simple form of an evaluator for operating the controls of some machine, as for example, a profiler, a lathe, a pulp digester, or other suitable device. The diagrammatic representation of Fig. 2 may be called a duplicating punch for the object to be attained is that of duplicating an old or worn perforated tape. The general operation of the duplicating punch is much like that of the senser except that instead of controlling the switches of an evaluator, it gags punches for determining the location of the holes to be perforated. The diagrammatic representation of Fig. 1 is much like that of Fig. 2 except that the perforated tape sensing mechanism is replaced by a series of manually operable slides for controlling the stated punch gags. The diagrammatic representation of Fig. 4 is similar to that of Fig. 3 except that the manually operable slides are operable by preselected gear train.

The senser is particularly useful for controlling machine tools, chemical devices, or other devices that are to be operated in accordance with a determinable routine or cycle. The duplicating punch is primarily useful for replacing old or worn tapes by new ones. It is to be understood that a duplicating punch may make a new tape from a prearranged sequence of tape fragments. For example, suppose one has tape fragments corresponding to straight lines, circular arcs, hyperbolic arcs, etc. It is easy to understand that suitable portions of these fragments may be joined together to form a new contour. The piecing of such fragments is particularly useful in template work. The manual punch is very useful for constructing perforated tape fragments corresponding to some special curve. Thus, it may be required that a portion of a contour to be profiled is a portion of an arc of a catenary, or a portion of an arc of a tractrix, etc. Some of these arcs may require some tedius computations as well as tedius hand manipulations. An operator of the manual punch may be given tabular data corresponding to such arcs, and, by a proper manipulation of the cams, a short length of arc may be readily constructed as a tape fragment. The counting punch is intended for constructing relatively long fragments by a process analogous to antidifferencing. It is particularly useful for constructing relatively long fragments corresponding to straight lines of a predetermined slope, tape fragments corresponding to cams having slowly varying curvature, etc. The fragments constructed by the manual punch, or by the counting punch, or both, may be pieced together to form a master tape for the duplicating punch, whereby one long continuous tape can be constructed which represents a contour built up of individual fragments. The foregoing descriptions of the representative four machines include sufficient mechanism for constructing perforated tapes corresponding to almost any conceivable article to be fashioned by a machine tool, or to almost any conceivable program associated with a chemical process, or other applications of the principle that will readily occur to anyone skilled in the art to which this invention pertains.

Each of these machines contains a main drive; and some of the punches may have an auxiliary drive instead of the more complete mechanism disclosed in the cited Kalkulex applications. This is true because of the degraded symmetry of most of the Kalkulex units used herein. The senser and the duplicating punch are provided with a tape looper—which somewhat remotely simulates the looper used on moving picture projectors. The function of the looper is to form a short loop of tape through the sensing mechanism so that the mass of tape moved by an intermittently operating tape feeding mechanism is substantially a minimum. Both the senser and duplicating punch are provided with a sensing Kalkulex unit which includes a tape chamber and intermittent tape feeding mechanism. Each of these machines is provided with transsetters of an elementary type. All the mentioned machines are provided with a transverting Kalkulex unit for converting the movement of sensing pins into a suitable mechanical displacement for governing the operation of switches or for gagging punches. Both the manual punch and the counting punch are provided with introducing Kalkulex units which may be likened to a keyboard or an equivalent thereof; this mechanism takes the form of a series of manually operable slides of cams for controlling the positioning of the punch gags. The senser is provided with an elementary electrical type of evaluator instead of a mechanical evaluator.

It is to be understood that other Kalkulex units than those specifically mentioned may be included in any of these machines if the exigencies of a particular situation should demand the presence thereof. This matter will be touched upon hereinafter.

FRAMEWORK

The framework, as a whole, for several variant forms of the machines including the present invention, is shown in Figures 1, 2, 3, and 4. As in all Kalkulex machines the framework is tailored for particular exigencies; the frames to be described are particularly adaptable to the simple devices fully described herein. Each machine may be viewed as consisting of two pairs of stacks of plates, one stack being identified by $a$, the other by $b$. These two stacks are separated by a spider frame $e$, and attached to each stack of plates there is a bearing frame $d$, which frame may sometimes be attached to stack $b$. Elements $a$, $e$, and $d$ are firmly connected together by a pair of dowel bolts $f$ at each end of the stack $a$. In a similar manner, the parts adjoining the stack of plates $b$ are connected by dowel bolt $g$. This mode of construction forms a simple and convenient method of attaching the components of a machine together. The use of dowel bolts for these connections has the added advantage of correctly aligning all parts as an incident to the assembly of the mechanism, for the said dowel bolts determine fiducial planes for accurately and practically aligning the frame as a whole as well as properly locating certain carriages, sensing elements, etc., as will more fully appear hereinafter.

The stack of plates $a$ constitutes supports, bearings, and housings for the sprocket wheels and friction rollers which feed the tape intermittently. They also form the top and bottom of the tape sensing chamber. The stack of plates $b$ has a similar function for the punching of a fresh or new tape.

The spider frame $e$ is a connection between stacks $a$ and $b$, and it contains ball races for supporting the sensing carriage 30, and the gag carriage 20. The frames $e$ may be used for additional purposes such as supporting frames for a switching assembly for one or more evaluators as in the case of the senser of Fig. 2, or other desirable adjuncts.

The bearing frame $d$ is used primarily as a support for the extreme ends of the main shaft 10, or as a support for the bearings of the auxiliary shaft 11. These frames also contain half of the bearings required for the reel driving shaft 51 (see Figs. 14 and 15).

At times, it is desirable to have a looper mechanism for gradually transferring the tape from a supply reel to a storage reel. The looper frames $h$ consist of a pair of castings having a large number of recesses, grooves, etc., therein for supporting the mechanism of the looper. The frames $h$ are constructed so that they fit between the castings $d$; they are connected together by the bolt $j$, and fastened to the castings $d$, by the bolts $k$. The frames $h$, with their contained mechanism, form a single unit which may be added to or removed from the machine as a complete looper mechanism.

The looper may be correctly viewed as the tape handling mechanism of certain Kalkulex units, as for example, sensers, punches, formulators, printers, or the like.

The main driving motor M (shown schematically as a circle) may be placed on the top of the looper castings $h$, or in some other suitable place. The motor M may be connected to the shafts 10 and 11 by any suitable power transmitting mechanism such as the gears $m$, the shaft $n$, and the gears $p$. The shaft $n$ may be supported by suitable bearings (not shown) mounted on the castings $d$, or in any other suitable manner.

The mechanism disclosed herein comprises devices for sensing the presence or absence of perforations in a tape. To those not skilled in the practical use of such devices, it may seem that the mechanisms disclosed are overgenerous in size and superabundantly endowed with strength for effecting such a simple operation. Machines of this type should function reliably with a minimum of service, as well as operate at speeds that are extremely high as compared with the distantly analogous machines of the prior art. Among the compelling factors which contribute to the apparent massiveness are the following: These devices are constructed largely of mere stampings and die castings. There are certain dimensions which must be reasonably accurate. This condition is most readily attained by an apparent massiveness. Again, certain elements, and in particular, the sensing needles, must act gently upon the tape and there must be no undue strain on the tape when certain needles fail to find a perforation. This requireemnt also calls for reasonably accurate dimensions which must be maintained over long periods of time. This condition is most readily met by providing very low mechanical stresses in the operating parts. This is particularly true of bending stresses and torsional stresses. The requirements of the low stress conditions dictate relatively large and massive carriages for carrying the sensing needles, and the latter call for relatively large shafts which in turn call for correspondingly massive bearing supports and housings. Alignment must be maintained on both sides of a tape chamber; this condition is most readily satisfied by generously proportioned dowels and elements aligned by the said dowels. This requirement results in very generously proportioned tape chamber elements. Other conditions will appear as the detailed description proceeds.

MAIN OPERATOR

The term, main operator, includes the principal mechanical driving elements of the machine, and strictly also, a source of electrical power for energizing the driving motor and for energizing certain portions of the selsyn-evaluator system.

The source of electric power is merely the usual service mains. Each of the machines diagrammatically illustrated in Figures 1, 2, 3, and 4 is driven by a conventional form of electric motor M which is connected by suitable gearing to the main shaft 10 or to the shafts 10 and 11 as the case may be. The mechanical connection between M and the shaft 10 or the shafts 10 and 11 may be of any well known form and it is shown as appropriate sets of spiral gears on a vertical shaft $n$, for driving shafts 10 and 11. It is usual, in perforated record controlled machines, to have a friction clutch between the driving motor and the main drive shaft or shafts, as the case may be. This friction connection may have any desired form such as a disk clutch or a belt. Neither of these conventional devices is shown in the drawings, for the mode of operation is both well known and very commonplace. As a matter of interest, the machine disclosed herein, when operating at normal speeds, emits a sound strongly simulating that of a domestic sewing machine.

The shaft 10, is shown in part in Figures 1, 2, 3, 4, 9, 11, 12, 13, 14, and 15. The description of the functions of the main shaft can be readily understood by referring to Fig. 9. Rigidly mounted on one end of the main shaft 10, is one of the spiral gears p, for turning the shaft 10. If desired, there may be a spiral gear p, at each end of the main drive shaft 10 as is well understood in many arts, and the driving motor may have a double connection thereto. This construction is advantageous if the machine is to operate upon a very wide perforated tape, for this type of construction will minimize the undesirable effects of an appreciable torsion on a long shaft.

Rigidly mounted at the middle of the main shaft 10 is a gear 14 for driving the looper. The gear trains driven by the gear 14 will be described in detail under the heading "Looper." Near each end of the main shaft, there is rigidly mounted an eccentric and Geneva driver assembly 18, Fig. 9, comprising a pair of mutually opposed eccentrics 16 and 17 with a Geneva driver 18 between them. The eccentrics 16 operate links 19 for reciprocating the gag carriage 20, and the eccentrics 17 operate links 29 for reciprocating the sensing carriage 30. Each of these carriages will be described in detail under appropriate headings elsewhere herein. The Geneva drivers 18 are used for intermittently feeding the tape through the sensing chamber, or through the punch chamber, or both, as the case may be. The construction of shaft 11 may, for convenience of manufacture, be identical with shaft 10. The gag carriage 20 and the sensing carriage 30 may be driven from the shaft 11 if desired as is shown in Fig. 1. Again, the sensing carriage 30 may be driven by the shaft 10, and the gag carriage 20 may be driven by the shaft 11. The possible arrangements for reciprocating the carriages are shown in Figs. 1, 2, 3, and 4. Such wide choices are characteristic of all Kalkulex machines. In every case, the looper, when present, is driven by shaft 10. In the case of punching, the newly punched tape is fed by shaft 11 through the appropriate Geneva drivers 18.

The relative timing of the various elements driven by the main shaft will be more particularly described under the heading "Timing and control."

LOOPER

The looper has several functions, which may be tabulated thus:

(1) Keep the tape taut as it is unwound from a supply reel.
(2) Feed the tape gradually from the supply reel.
(3) Form a loop in the tape prior to entrance to the sensing chamber.
(4) Feed the tape intermittently through the sensing chamber.
(5) Form a loop in the tape after it leaves the sensing chamber.
(6) Feed the tape gradually to a storage reel.
(7) Keep the tape taut as it is supplied to the storage reel.
(8) Contain mechanism for reversing the direction of tape feed.
(9) Contain mechanism for reversing one or more evaluators.

In the description of the looper, the gear trains will be described first, then the path of the tape will be described, and finally the functions will be described in the order listed.

Figure 14:
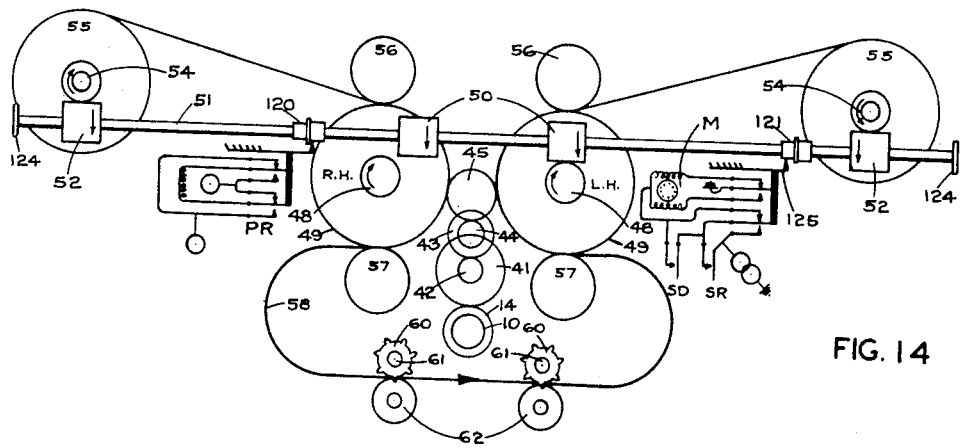
Fig. 14 is a diagrammatic conventionalization of the tape reel mechanism showing certain switching mechanisms that may be associated with the tape reeling mechanism.
Figure 16:
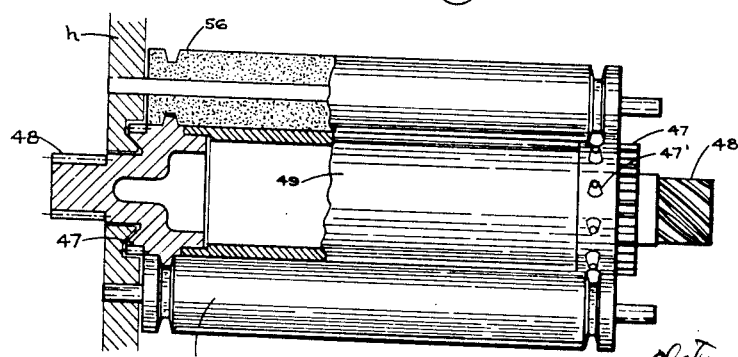
Fig. 16 is a combined side view and section of a tape feeding drum of the tape looper mechanism.

The description can be followed from Figs. 9, 13, and 14 with occasional references to other figures which contain the specifically mentioned element. The main shaft 10 has already been described as having rigidly mounted thereon a gear 14 near its midpoint. Meshing with gear 14 is a suitably supported gear 41 which is attached to a pair of pinions 42 which in turn meshes gear 43. Reference to Figure 13 shows that these gears and pinions are at about the center of the machine. Gears 43 are fixed to shafts, the other ends of which have fixed thereto pinions 44 which in turn mesh with an idler 45, which in turn meshes gears 47 integral with each of two sprocket carrying feeding drums 49 (see also Fig. 16).

Each sprocket carrying drum 49 (see Fig. 16) comprises a mid-cylindrical portion terminated by sprockets 47'. The distance between the centers of the sprocket teeth is the width of the tape (see Figs. 5, 6 and 8) between the center lines of the square perforations near the margins of the tape, and the pitch of the sprocket teeth is the pitch of the square perforations of the tape so that when the feeding drums are rotated, they will correspondingly feed the the tape. Each feeding drum has integrally attached thereto a gear 47 and a spiral gear 48 at each end (see Fig. 16). The cylindrical portion 49 at the junction of the spiral gear 48 and the web of the gear 47 forms the supporting journal for an end of the feeding drum as is clearly indicated in Fig. 16. The spiral gear 48 of one feeding drum meshes with a mating spiral gear 50 (see Figs. 14 and 15) fixed to the shaft 51. At each outer end of shaft 51, there is a spiral gear 52 rigid with said shaft. Each gear 52 meshes with a companion spiral gear 53 fixed to the shaft 54 of the tape reel 55. Each tape reel 55 is frictionally attached to its shaft. The frictional adjustment is such that the frictional connection will slip when the tape is sufficiently taut to avoid undesirable festoons and/or bunching on the reel. The direction of rotation of the reels 55 is such that they always tend to wind up the tape as can be easily seen by following through the gear trains of Figs. 14 and 15. The shaft 51 is normally movable along its axis so that said shaft is resiliently held in either of the two possible positions.

The mentioned resilient means for holding shaft 51 may be used for the additional purpose of reversing the motor M, and other desirable functions. This mechanism will be fully described elsewhere herein.

Figure 15:
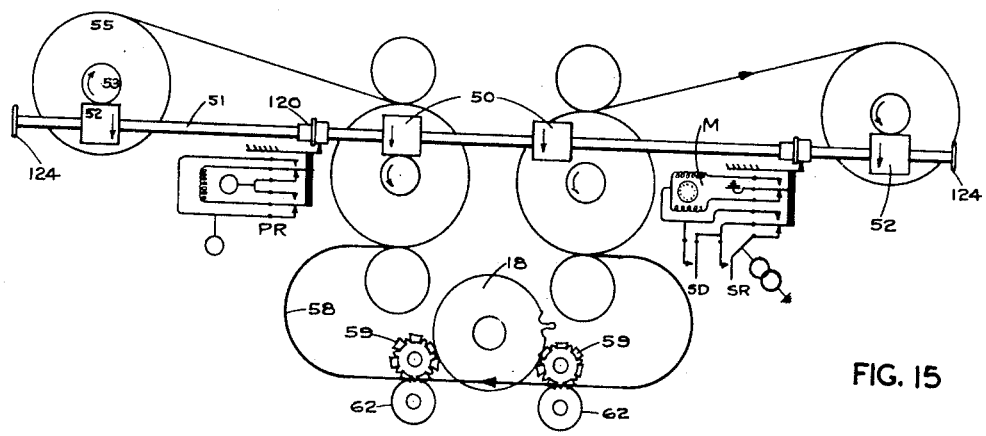
Fig. 15 is similar to Fig. 14 with the parts in a different position.

The path of the tape 58 and its directions of movement are best seen in Figures 14 and 15; these two figures are copiously supplied with direction arrows so that inspection thereof is a sufficient description of functions 1 and 7 of the looper which have been specifically set forth at the beginning of this article.

An inspection of the arrows in Figures 14 and 15 shows that the tape is pulled from the supply roll by one of the feeding rolls 49 against the tendency of the reel to wind the tape. It therefore follows that the tape should fit snugly about the feeding roll 49; this is effected by a friction roll 56 which is resiliently pressed towards the roll 49, the amount of the pressure being sufficient to insure that the described action occurs. The feeding rolls 49 travel at a speed corresponding to the length of the briefly described intermittent feed of the tape, during each rotation of shaft 10. The requisite speed for the feeding drums is attained by the gear train beginning with gear 14 on the main shaft and ending at the feeding drums.

After the tape passes about halfway around a feeding drum 49, it is fed outwardly by the combined action of 49 and a friction roll 57 to form a loop 58 prior to entering the sensing chamber. The function of the loop 58 corresponds closely to the loop used in moving picture projection machines; that is, there is a short length of tape having only a small mass which is quickly and intermittently fed through the sensing chamber by suitable intermittently operated sprocket feeding means.

The intermittent tape feeding means comprises two pairs of sprockets 60 (see also Figs. 12, 13, 26, 27, 29, and 31); each sprocket of the pair is fixed to a shaft 61 in such a location that its teeth can mesh with the square holes at the edges of the tape, and further, the tape is held against the pitch drums of the said sprockets by suitably arranged presser rolls 62. Fixed at one end of one of the shafts 61 is a suitable Geneva star wheel 59 which meshes with the Geneva driver 18. The Geneva driver 18 at the other end of the main shaft serves to drive the other pair of feeding sprockets. It is a matter of indifference which of the shafts 61 is driven by a particular Geneva driver so long as the proper relative timing is attained, as will appear in more detail elsewhere herein. Here is another example of design choice in Kalkulex machines.

The intermittent feed suddenly enlarges the discharge loop, and this enlargement is gradually diminished by the assembly of rolls 57 and 56 with feeding drum 59 of the output end of the tape, thus feeding the sensed portion of the tape, through a loop, gradually to the storage reel 55, and, due to the frictional drive of the storage reel 55, the tape is kept taut.

This completes a brief and general description of the functioning of the looper. There are some interesting and novel features in the mechanical construction of the looper. The principal part of the looper comprises the above described gear trains and tape feeding rolls and sprockets. All of the parts are mounted on, or between, two bearing castings $d$ (see Figs. 1, 2, 3, and 4) which are utilized in duplicate. Each casting $d$ contains an end bearing of the main shaft 10. This casting has certain recesses therein for clearing the links which surround the eccentrics 16 and 17. Other recesses accommodate the spiral gears 50, and still others form clearance recesses for other elements.

The castings $h$, which also appear in duplicate, support all of the rolls 49, 56, and 57 as well as a portion of the gear train driving these rolls. Provision has been made for removing the said rolls 47, 56, and 57, thus completely removing the looper mechanism except the intermittently driven sprockets 60. Reference to Figs. 2, 3, and 4 shows a like arrangement for supporting the shaft 11.

The looper mechanism comprising the sets of rolls 49, 56, and 57, the tape reels and the drives therefor, is in the nature of a flexible strip feeding and handling mechanism; it is not an absolute necessity for the correct and proper operation of the machine. It is, however, a very desirable adjunct for the perforated tape is relatively fragile, and it could be easily damaged accidentally if there were no specific provision for keeping those portions of the tape not being sensed in a convenient and reasonably compact form.

A careful inspection of the looper mechanism will show that several additional functions may be performed if desired. As obvious examples, the looper as a whole is disconnected from the drive shaft if it is slightly elevated with respect to the main shaft. Again, a double train of gearing extends from the center of the machine to the feeding drums 59. If desired, one train can be omitted, or there may be a separate train for each feed roll 59 so that each feed roll can be independently driven. If desired, each feeding roll 59 can be arranged to be driven manually by the provision of suitable manipulative knobs. None of these modifications are shown; they are mentioned to call attention to the possibility of effecting certain operations not specifically shown. These possibilities fairly illustrate certain of the inherent modifications which may be more or less readily incorporated into properly designed Kalkulex machinery.

REVERSING THE TAPE

At times, it is necessary to reverse the direction of the tape feed; thus, when the supply reel is empty and the storage reel is filled, it is necessary to feed the tape relatively backward. This matter has been briefly considered under the article "Looper" where the gear train which drives the reels was fully described in connection with Figures 14 and 15.

Mounted on the shaft 51 is one or more double level collars 120 and 121. The collar 121 is specifically associated with the reversing of the Senser driving motor M and with the mechanism for stopping the said motor M when the end of the tape is reached. The said collar 121 determines the position of leaf spring 125 which in turn controls the tongues of a pair of single throw double pole switches. The opposite poles of one of the said switches are connected to the terminals of the double field windings of the motor M. The tongue of said switch is grounded, and the midpoint of the said double field windings of the motor M is also indirectly grounded through a pair of sensing switches SD and $S_r$. The tongue of the other double pole single throw switch is also governed by the spring 125 in accordance with the usual manner of operating multiple tongue switches.

Consider the position of Fig. 15. Tracing the circuit from ground through the switch tongue, then to the closed contact, then to half the field windings, then to the field midpoint, then through SD, then through the switch tongue, then to the closed contact of switch and finally through the voltage source to the ground. During the major part of the tape feeding, switch SR is also closed so that there is a double connection to the source of voltage. When the end of the tape is approached, the switch SD is opened, and the motor circuit is broken. When the time for restarting has arrived, button 124 at the end of shaft 51 is pressed in, and the motor starts again.

Pressing of said button 124 mechanically relatively reverses the direction of the reel drives as has been described under "Looper." This movement also causes a reversal of the tongues of the two switches controlled by spring 125 so that a circuit can be traced, thus: ground through switch tongue to the other half of the second single throw double pole switch, thence to switch tongue, thence to SR, thence to the voltage source, thence to the ground, thus completing the circuit and starting the motor M. Shortly thereafter, the switch SD closes, but such closure merely bridges a closed contact and hence does not alter the circuit just traced.

When the end of the tape is reached, the switch SR opens, thus breaking the circuit of the motor M and stopping the machine. When the shaft 51 is again shifted, the two single throw double pole switches have the positions of the first circuit traced. The motor starts because switch SD is closed. Shortly thereafter, SR closes also, thus bridging an otherwise closed circuit. From the two circuit tracings, it is seen that the machine always stops when the end of the tape is reached, and such stopping occurs by virtue of the opening of switch SD at one end of the tape. The switch SD is controlled by one set of perforations, and the switch SR is controlled by another set of perforations. These sets of perforations may be sets 5 and 6 of Fig. 6 or any other desired pair of sets. Ordinarily, the two said sets of perforations occur between columns I and II of Fig. 6.

Figure 24:
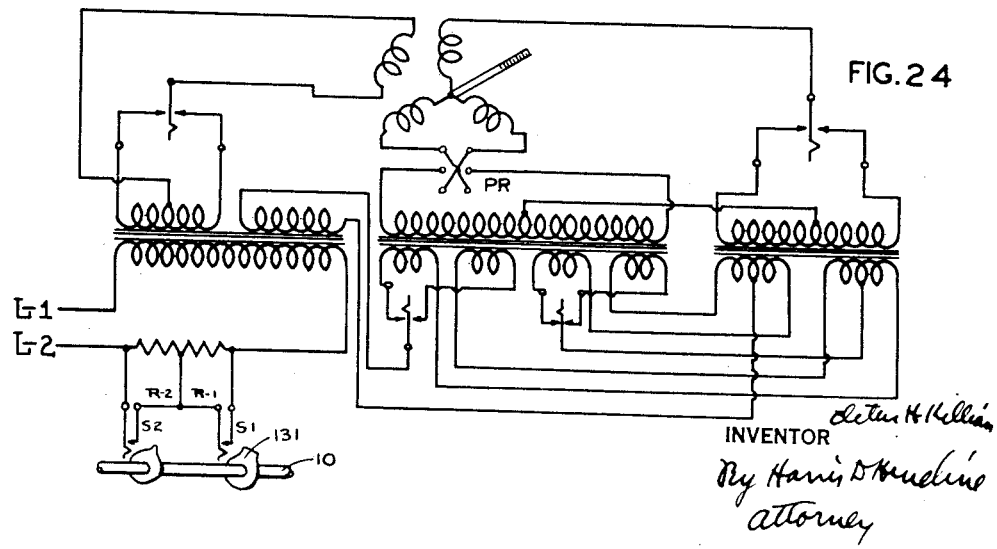
Fig. 24 is a schematic circuit diagram similar to Fig. 23 having fewer switches for obtaining substantially the desired results.

The collar 120 may control one or more double throw double pole switches. The tongues of such switches may be connected to a transformer coil (e.g., the sine secondary of Fig. 24) and the poles thereof connected to a pair of phases of the selsyn as shown in said Fig. 24. This reversing switch may be used to ensure that the cutter will always travel in the same direction (say, anticlockwise) around the contour irrespective of the direction of tape movement. Obviously, there may be a phase interchanging switch for each selsyn, as shown in Fig. 24 at PR.

THE TAPE

Under this heading, the tape as a physical entity and the tape as a carrier of information will be fully described. An end of the tape showing the possible location of all perforations is shown in Fig. 5. The tape feeding is accomplished, in part, by sprocket teeth meshing with the substantially square holes near the margin, and this is the sole function of these holes. The method of feeding and the mechanism associated therewith have been fully described in the article "Looper." All of the remaining circular perforations are used for recording information, or the data requisite for the proper operation of an evaluator or punch as the case may be. Each tape inherently contains a plurality of sets of possible perforations. One set of possible perforations comprises the zig-zag series of full and dotted perforations adjacent to a line of square holes; one such series is identified as set 1 in Figs. 5 and 6. Another set of possible perforations is that adjacent to the first mentioned zig-zag line, identified as set 2 in the cited figures; and so on, across the width of the entire tape as indicated in the drawings. The specific fragment illustrated shows 12 sets of possible perforations. It is to be understood that tapes may be either wider or narrower than the specific example illustrated so that a tape can contain either more or fewer sets of perforations. In extreme cases, the tape may contain 30 to 40 sets of perforations, that is, 2½ to 4 times as wide as those specifically illustrated in Figs. 5, 6, and 8.

For convenience of explanation, each set of possible perforations is divided into two classes—the first class is identified by full circles, and the second class is identified by dotted circles. Further, each class is divided into two species—the first species is identified by full circles, and the second species is identified by circles containing a central dot.

The object of perforating a tape is to permanently recorded data that can be interpreted by suitable, and preferably very simple, machinery. It is reasonable to suppose that a simple and convenient method of machine sensing is one such that one or the other of two possible locations will be found by a pair of interconnected sensing needles or pins. Such a system is fully disclosed in the cited Kalkulex applications, and it is also the system adopted here. One or the other of two bits of information is identifiable with such a system. For example, suppose the data to be recorded by a possible set of perforations (i.e., the above mentioned zig-zag line) is (1) The presence of a symbol (say, an * is present), or
(2) The absence of a symbol (say an * is absent);

then, the first bit of information may be recorded by a full circle whereas the second bit of information would be recorded by a dotted circle. To the uninitiated, this may appear, as a first impression, to be a sort of supernumerary method of recording data. When contrasted with the prior art, this "first impression" is correct for the prior art recording would take the form of the presence of a perforation to commemorate the presence of a symbol, and the absence of a symbol (or perhaps, vice versa).

For emphasis, it is repeated that the supposed information and the absence thereof, are each represented by a perforation—but, the perforations are in different locations, thus accounting for the above mentioned two species of perforations. In a sense, this is a dual system, and further, it may be viewed as characterized by the same grade of symmetry as that existing between an object and its mirror image, or its mirror image combined with a glide distance. To restate the system of recording in other words, the presence of a symbol is recorded by a perforation in a predetermined location; whereas the absence of a symbol (or the existence of the specter, or image of a symbol) is recorded by a perforation which may be correctly viewed as the mirror image (perhaps with a guide) of the first mentioned perforation. In terms of the technology of the art or science of symmetries, the recording of data has at least a monoclinic grade of symmetry.

For the purposes of further illustration of the system of recording data by perforations, Fig. 6 shows a fragment of a perforated tape containing the following information listed in Table A:

Table A

```
0 * 0 * 0 *   0 * 0 *   0 * 0 * 0 * 0 *   0 * 0 * 0 * 0 * 0
0 0 * * 0 0   * * 0 0   * * 0 0 *   * 0 0 *   * 0 0 * * 0 0 * * 0 0
* * * * 0 0   0 0 * *   * * 0 0 *   * * 0   * * * 0 0 0 0 * * * * 0 0 0 0
0 0 0 0 * *   * * * *   * * * 0 *   * * * *   * * * 0 0 0 0 0 0 0 0

4 5 6 7 8 9 10 11 12 13 14 15 0 15 14 13 12 11 10 9 8 7 6 5 4 3 2 1 0
``` in a pair of parallel columns where each column has four zig-zag lines, i.e., sets. The information in the one column differs from that in the other column for there is a location shift and a reverse as well. Indeed, the tape fragment shows the arrangement of perforations corresponding to the center of the cutting tool approaching a corner, then turning the corner.

For the sake of contrast, the presence of a perforation is indicated by a solid black circle for each species of perforations. For the purposes of identification with the table above, Fig. 6 has a double array of numerals from 0 to 15 inclusive near the margins of the tape.

Suppose one seeks to identify the item of information

*
0
0
*

9 in Fig. 6; one seeks the horizontal lines identified by the "9's." The array of perforations corresponding thereto is shown in Fig. 7. One may identify the two *'s as the two perforations at the bottom of Fig. 7 and absence of *'s, preferably the ghost or specter of *'s (hereinafter called specter) as the two perforations at the top of Fig. 7.

It is easy to see, by a comparison of Figures 6 and 7 that the object and specter in the latter figure are separated by an appreciable distance, and further, that another object and another specter ordinarily lie between the object and specter corresponding to 9. Referring to Fig. 6, it is seen that the object portion corresponding to 10 and the specter portion corresponding to 8 lie between the object portion and specter portion of 9. It is to be understood, as will be more clearly seen hereinafter, that this arrangement merely comprises an illustrative example. In some instances, it may be desirable to have two object portions and two specter portions between the object and specter portion of any entity. Such an arrangement is shown in Fig. 8. As a matter of interest, Figures 6 and 8 contain exactly the same data (except at the extreme top and bottom), yet they superficially appear very different.

All of the other 15 different bits of information may be likewise located in Fig. 6. When Fig. 6 is compared with Fig. 5, it will be seen that only half of the possible perforations occur in Fig. 6; in each and every instance, there is either a perforation indicated as a full circle in Fig. 5, or the specter of a full circle appears; but in no case does both a full circle and its specter appear—always, it is the one or the other.

Returning to Fig. 5, it may be said that the possible perforations are indicated by full lines, and their specters appear as dotted circles. It is important to keep in mind the symmetry of perforations, for one can say with equal truthfulness that all possible perforations are indicated in Fig. 5 by dotted circles, and the specters thereof are indicated by full line circles. This dualism is of considerable importance in the sequel and in the functioning of the evaluator to be described later. Considerable stress has been laid on the symmetries of the tape and the system of perforations used, for this symmetry is of the utmost importance in the proper functioning of the device disclosed herein. There are a large number of symmetries in Table A which are of great importance. Let each 0 in Table A be regarded as the specter of an absent *. Now, Fig. 7 has been identified by the numeral 9. If the arrangement identified as 6 be found in Table A and also in Fig. 6, it will be seen that they are mutually related as object and specter. A little further study of Table A will show that, if a mirror is imagined as placed between 7 and 8 of Table A and also between 15 and 0, then that part of Table A on one side of the supposed mirror is the specter of that part on the other side of the supposed mirrors—further, this is a mutual relationship.

Needless to say, exactly the same relationships exist in Fig. 6, but these mutual object and specter relations are not as patently evident because there is a relative glide between object and specter. A little study of Fig. 6 will, however, quickly reveal that a number of obvious translational symmetries appear. Some of these translational symmetries can be most readily seen by occulting all of the sets in Fig. 6 except one of them.

These translational symmetries are most evident for sets 1, 2, 7 and 8. The combinations of sets 1 and 2 also show a slightly more complicated sort of translational symmetry. With a little practice, a similar symmetry can be seen when three sets are viewed with the exclusion of the others. These symmetries in the tape itself are very important factors which contribute much to the simplification of the mechanical sensing mechanism to be described in detail hereinafter.

These translational symmetries also appear in Table A. If the last line of Table A is supposed to be deleted, then mirrors can be supposed to be placed between 3—4 and 11—12, as well as the first supposed set. Again, there is the mutual relation of object and specter on each side of the supposed mirrors. This same process may be carried out by supposing both the third and fourth rows of Table A deleted, then supposing the existence of mirrors located at proper positions; again like results will follow. Needless to say, there is a corresponding symmetry in Fig. 6 with glides superimposed thereon. Enough has already been said to clearly indicate the existence of conspicuously phenomenal symmetries in the system of perforations, and it is accordingly proper to adopt a correct technical terminology therefor.

In the technology of finite periodic groups, the system of perforations adopted is a mere isomorph of a simple sixteenth order Abelian group. It will be assumed that those skilled in the art or science to which this invention belongs are familiar with the science of the elements of finite groups. To such persons, the following list of isomorphs of the 16th order Abelian group are either self evident, or will become so as the detailed description proceeds.

*Table B*

SOME ISOMORPHS OF AN ABELIAN GROUP (1) The code of perforations corresponding to the information listed in Table A.
(2) The perforations in the tape fragment of Fig. 6 or of Fig. 8.
(3) The 16 sixteenth roots of unity.
(4) The sixteen fourth order non-singular diagonal matrices constructed with —1 and —1 as the nonevanescent elements.
(5) Any sixteenth order gyric group.
(6) Any mechanical displacements isomorphic with the perforations of Fig. 6 or of Fig. 8.
(7) Any electrical switching system isomorphic with the perforations of Fig. 6 or of Fig. 8.
(8) The complete residue system (modulo 16).
(9) Any sixteen step, two way ratchet, sixteen step selsyn generator, etc.
(10) The alternating currents in the selsyns mentioned in isomorph 9.
(11) The currents in the switching system mentioned as isomorph 7.

Much of the remainder of this specification deals with the listed mechanical and electrical isomorphs of the mentioned Abelian group. It may be proper to point out that isomorph 8 is exactly the last line of Table A, and it is also the array of numerals at the edges of the tape fragment of Figures 6 and 8. In the language of simple arithmetic, the arrangement of perforations of Fig. 6, and Table A as well, is a mere listing of symbols more or less appropriate to a bioctagesimal system (sometimes known as a sexadecimal system) of numeration (e.g., the familiar sixteenths graduations of measuring rules). The use of such symbols for pencil and paper computations might appear to be extremely awkward and clumsy, yet for appropriate machinery, they may serve excellently. As a matter of interest appropriate symbols can be used to greatly facilitate pencil and paper computations, and such symbols are mere obvious isomorphs of those illustrated.

Again, isomorph 5 is little, if any, more than the application of a sexadecimal system of measuring certain rotational steps (e.g., the familiar compass card divided into sixteenths). Isomorph 3, particularly when viewed in the light of the vector representation of alternating currents, is merely the algebraic method of representing Table A; and isomorph 4 is substantially the same mode of representation by eliminating the imaginary expressions that appear in the sixteenth root of unity.

Reasoning from these statements, it is easy and proper to infer that the remaining isomorphs are also correct because of the specific limitations of the phraseology used in defining the isomorphs.

It is to be understood that the bioctagesimal system described is merely an illustrative example. The slightly simpler octagesimal (i.e., having a radix half of the radix of a sexadecimal system) system or the slightly more complicated tetraoctagesimal system (i.e., having a radix which is twice the radix of a sexadecimal system) may have been chosen as illustrative examples. In machines actually constructed and used, the bioctagesimal system has been adopted, for the limits of accuracy imposed on the work to be accomplished are such that the system amply suffices. With coarser limits, a lower order system may be used; with finer limits, a higher order system may be required.

Suitable tapes may be made of a variety of materials. Thus, a good grade of kraft or long fibered sulphite paper is satisfactory. Several plastics serve excellently, as for example, certain of the cellulose base plastics such as cellulose acetate, cellulose nitrate, or the like. Certain impregnated fabrics are also good, such as cambric or poplin or voile impregnated with certain of the rubber derivatives (e.g., Pliofilm, Tornesit, etc.). If extreme durability is desired, the tape may be made of metal such as thin steel, a hard brass, beryllium copper, etc. The choice of material for the tape is largely a matter of user preference as well as the amount of use that the tape may be required to withstand. Acetate tapes have been found to be reasonably satisfactory for experimental tests.

In the specific invention disclosed herein, four sets of perforations, as for example column I or column II of Fig. 6, are used for controlling a selsyn through an evaluator. The specific example shown is adapted to control two selsyns, and two sets of perforations are reserved for other desired purposes. It is to be understood that tapes of any desired width may be used for controlling a corresponding number of selsyns, or other desired devices. It is also to be understood that more sets of perforations (e.g., five or six sets) may be used for controlling a selsyn, as will be more fully described under the heading "Evaluators."

The tape is used for governing the rotations of the evaluators, and such rotations consist of more or less lengthy rotations in either of the two possible directions (forward and backward). Each of these rotations comprises an integral multiple of some angular displacement, as will appear more fully hereinafter. Therefore, the perforations in the tape consist of corresponding series of consecutive positions such as the marginal numbering of Figures 6 and 8 clearly indicates. Indeed, these two figures show the arrangement of perforations corresponding to the path of a cutting tool approaching a corner and progressing onward at substantially a right angle. The described motion consists of predetermined steps, each of a predetermined length. For the sake of a numerical example, suppose that the rotary steps consist of 1/16 of a rotation and that the shaft which rotates 1/16 of a complete turn is suitably geared down so that an element (e.g., a milling machine table, a lathe carriage, a planer saddle, a boring bar, etc.) moves 0.002". Under this assumption, when the tape perforations 7 (say) are controlling said element, then the said element will have a certain position; when the next perforations 8 (say) are controlling, then said element will be moved 0.002" (forward, say, for the sake of a particular direction) from the said certain position; had the next position been 6 (say), then the said element would have moved 0.002" in the opposite direction (backward). Looking at the tapes of Figures 6 and 8, it will be seen that in the case of column I, the perforations progress (forward, say) through successive steps to the symbol identified as zero, then progress in the opposite direction (backward, say) by corresponding steps. In the case of column II, the progress is always in the same direction. It therefore follows that the said tape fragments of Figures 6 and 8 represent a motion corresponding to a steady progression of an element in an east-west direction (say, for the purposes of identifying a particular direction) combined with a north-south direction (say) which finally reaches the point identified by zero, then a regression in south-north direction, thus forming a corner.

Figure 10:
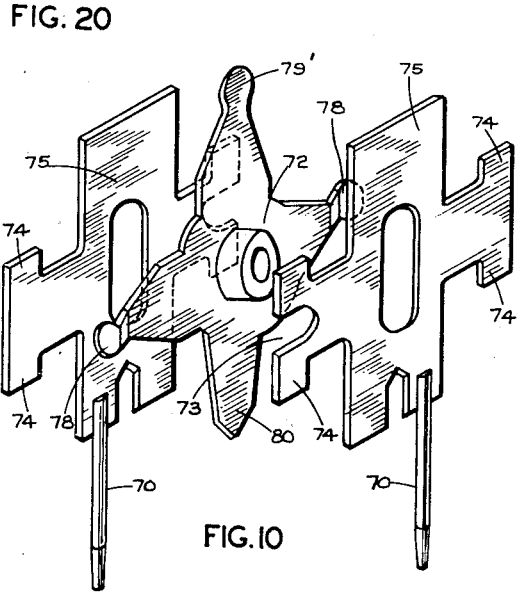
Fig. 10 is a digrammatic exploded view of a pair of sensing pins with their connecting rocker arm.

The preceding description relates merely to straight lines having a 45° slope. This example was chosen for explanation because of its extreme simplicity and frequent occurrence. In practice, other slopes occur. Thus, the illustrative tape fragment of Fig. 6 may have had column I as illustrated, whereas column II may have had a monotonous repetition of the same symbol. In that case, the tape fragment would represent a cutter going into a notch, then backing out; thus such a tape would correspond to a cutter entering a blank to form the notch 73 of Fig. 10, then starting to back out. Again, column II may have consisted of a very few different symbols (say, 6 repetitions of one symbol, 6 repetitions of the adjacent symbol, etc.), then the tape would represent a notch similar to 73 or Fig. 10 except that it would be slightly wider at the mouth. Again, the arrangement just described may have been such that the arrangements of column I and column II were interchanged. This would give identical results except that all directions would appear as if rotated through a right angle. Again the symbols may have been frequently repeated, etc. It is obvious that many other possible combinations may have been shown. Many of them would result in curved lines. Indeed, curved lines are commonly represented by polygons of many short sides. This matter will receive further attention later herein. From the foregoing, it should now be evident that the perforations in the tape actually represent the coordinates of a curve at substantially consecutive points, as for example—they may be points separated by a chordal distance of approximately 0.002", or of any other judiciously chosen distance compatible with the desired accuracy of cutting.

THE PHYSICS OF TAPE FEEDING

The feeding of a tape through a sensing or punching chamber, particularly with the above described mechanism, may appear to be a very simple and a readily understood mechanical action. In practice, this action is surprisingly complex. The problem is particularly important because the relatively fragile tape should have a reasonable length of useful life. It is the object of this article to disclose the more important problems encountered in flexible sheet feeding and some specific structures for solving said problems. There are a very large number of patents disclosing flexible strip feeding mechanisms; these patents, perhaps include the entire gamut of the tape and card controlled art. None of the prior art patents show more than particular solutions of only a few of the problems encountered in a properly designed positive strip feeder.

Certain elementary, yet fundamental, facts relative to flexible strip feeding are inherent in the action of hot sheet rolling mills. The usual rolling mill consists of a pair of rolls of substantially equal diameter, and the diameter is large as compared to the thickness of the sheet passing therethrough. The hot sheet passing between the rolls tends to emerge from the rolls along the direction of the common tangent to the rolls. This tendency is accentuated by having both rolls of substantially equal diameter so that each roll has substantially the same action on the surface of the metal. A like phenomenon is associated with the common wash wringer. Experiment will demonstrate that articles such as pillow cases, towels, etc., strongly tend to emerge from the wringer rolls in the direction of the common tangent of the rolls, and to maintain this direction for an appreciable distance beyond egress. It is obvious that a flexible sheet feeder should imitate both the rolling mill and the wash wringer.

Figure 31:
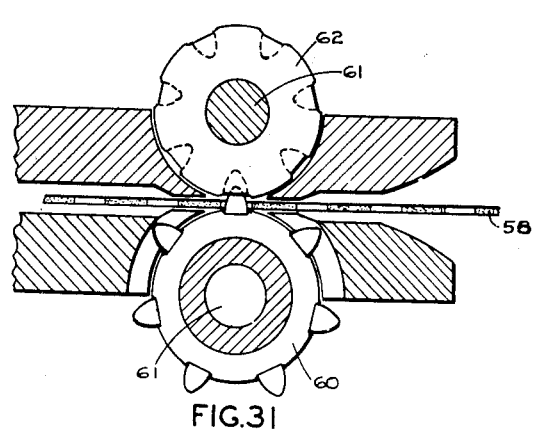
Fig. 31 is a view similar to Fig. 29 containing additional refinements.
Figure 29:
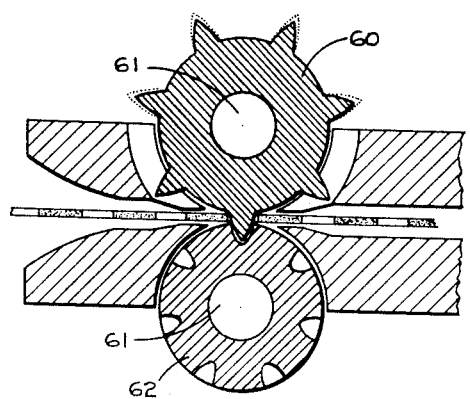
Fig. 29 is an end view of a tape feeding sprocket and presser roll in proper relation to either a sensing chamber or punching chamber showing the expedients utilized for overcoming certain problems involved in the feeding of strips which are provided with marginal feed perforations.

If the flexible sheet has a curling tendency (e.g., it is normally stored on a roll) the curl may be advantageously used to partially strip the tape from the roll to which it may tend to stick or adhere the more. If there is no tendency to stick, then the curl may be used to partially counteract gravity and thus increase the normal tendency to follow the common tangent of the rolls. Experience demonstrates that a web with a certain amount of inherent stiffness will be easier to manipulate than a sleazy material. Sleaziness may be partially counteracted by using a higher pressure or stronger nip between the rolls. Advantage can be taken of these simple and commonly known facts to design the doctor blade which almost touches the rolls to support and guide the flexible sheet after it emerges from the rolls, and guide it into the rolls. In general, the said doctor blade should approach the roll as closely as practicable, yet it must be at a predetermined distance from the common tangent of the rolls. A construction which can be attained in practice is shown in Figures 29 and 31. The said doctor blades comprise a choking of the tape chamber in the immediate vicinity of the ingress and egress to the feeding rolls, and the length of the narrowest part of the choke is approximately twice the circular pitch of the sprocket. If the tape always entered and emerged from the rolls in the ideal fashion, the doctor blades would be useless; however, if the tape tends to depart from the ideal, then the doctor blades will guide it towards the ideal position. The exact form and dimensions of the mentioned doctors is largely a matter of trial and error for differing tape materials.

Thus far, it has been tacitly assumed that the flexible sheet has no feeding holes and that rolls are at least as long as the sheet is wide. In practice, the feeding rolls nip only the edges of the sheet, and there are feeding holes near the edges (see Figures 5, 6, and 8). These constructional features modify the foregoing observations. These modifications will now be investigated.

The tapes of Figures 6 and 8 are provided with feeding holes near the margin. As a matter of engineering construction, the material between the more or less square holes simulates a thin section of the teeth of an ordinary rack or of a linkbelt; therefore, the feeding sprockets 60 (see Figures 12, 15, 19, 29, and 31) have gear teeth which properly mesh the mentioned simulated rack or linkbelt. Since the holes are punched, the sides thereof are, at least theoretically, straight sided (see Figures 29 and 31); therefore, the tape should be viewed as a thin section of a cycloidal rack at the pitch line and therefore the sprocket 60 should be provided with the mating cycloidal odontoids, thus definitely fixing the shape, length, etc., of the sprocket teeth. The feeding rolls therefore take the form of cylinders of predetermined length with a narrow sprocket at the middle of the one roll and a like cylinder with fully shrouded teeth for the cooperating roll, as is indicated in the sectional view of Fig. 29. The pitch circles of sprocket 60 and cooperating shrouded gear 62 have the center line of the tape as their common tangent. It is desirable to design the sprocket teeth as pointed, then relieve them so as to have ample clearance for the teeth when first entering and leaving the holes in the tape. The described alterations are diagrammatically shown in Fig. 29 where the full lines indicate the actual shape used for the sprocket teeth and the dotted lines show the theoretical cycloidal teeth. In some cases, the teeth of the sprocket 60 are constructed as mere circular arcs; analysis however shows that the teeth should be cycloidal; thus the dotted lines show the theoretical shapes when no allowance has been made for deviations from ideal dimensions. It is usual to assume a variation of about 0.3%–0.5% in dimensions. It is accordingly necessary to modify the actual teeth so that the tips correspond to the shortest distance and the thickness of the teeth at the root circle correspond to the smallest feed perforation—whereas the tooth pitch corresponds to a mean of the longest and shortest pitches on the tape. It accordingly follows that the correct tooth outline remains cycloidal, but that the rolling circle becomes smaller. In practice, it has been found that sprockets with involute teeth may be used provided that the pitch circle substantially coincides with the involute base circle. This is obvious inasmuch as the involute curve is perpendicular to the base circle at the point of contact. It therefore follows that the involute teeth must have a small clearance or relief below the base circle as indicated in Fig. 31. Since the involute curve is very sensitive near the base circle, the desired results may be approximately attained if the pressure angle at the pitch circle is small (e.g., 0° to 5°). All theoretical involute tooth forms are decidedly inferior to properly designed cycloidal forms for tape feeding. Practically all of the holes in the tape are slightly burred as an incident to the punching operation. It therefore follows that the "burr" side of the tape should be the dedendum side; and, there should be a notch or pocket at the root of the sprocket teeth to receive said burr (see Fig. 31). In practice, this inference has been found to be approximately correct; nevertheless, a few runs of the tape through the senser serve to remove the mentioned burrs as a fine dust, thus clearly showing a tendency of the sprocket teeth to grind or polish the tape feeding holes to smooth working surfaces. It therefore follows that, within limits, a tape that has been used for a time feeds better than a tape which has just been punched. It is therefore desirable to run a newly punched tape through a tape feeding chamber a few times to burnish the feeding holes before putting it in service.

This effect can be best attained if the feeding sprockets have substantially the correct odontoid shape. Such an operation may be called conditioning the tape.

When a feeding roll has been modified by including a sprocket, the mating roll is correspondingly modified. It is preferable that the mating roll have the form of a fully shrouded gear 62 (see Figures 29 and 31). The theoretical form is a mating gear whose addendum is slightly below the pitch line of the sprocket so that there will be sufficient room for the tape between the dedendum of the sprocket and the addendum of the cooperating roll gear as shown in Fig. 29; and the said addendum and dedendum surfaces should be cylindrical continuations of the corresponding roll surfaces. Substantially perfect mating can be attained if the odontoids have cycloidal contours. If the odontoids have an involute contour, the perfection of mating can be only approximately attained. In practice, it sometimes suffices to merely groove the cooperating roll (see Figures 12 and 27) so as to form a clearance for the sprocket teeth. The grooved construction amply suffices for the looper (see Figures 12 and 16). It should be clearly understood that this method falls short of perfection. The manufacture of fully shrouded gears, in small quantities by conventional methods, is both difficult and expensive—hence, the desirability of the described grooved construction of Fig. 12.

The general principle that the flexible sheet tends to follow the common tangent when passing between rolls with a nip is modified by the presence of sprocket teeth on one of the rolls, for (except at the pitch line) there is a frictional force between the walls of the tape feeding holes and the sprocket teeth whereby the tape will tend to cling to the sprocket instead of following the common tangent. This tendency can be, at least partially, nullified by arranging the tape so that its inherent curling tendency (due to being stored in coils—see Figures 14 and 15) opposes the friction on the sprocket teeth. Thus, referring to Figures 15 and 14, the tape should come from the tops of the reels 55 as shown. Again, since the tape will tend to wrap about the sprocket 60 (because of tooth friction), the cooperating rolls 62 should be made of a material which has a slight tendency to stick to the tape. Again, the above described mode of reducing the thickness of the sprocket teeth towards the addendum partially reduces the tooth friction and thus reduces sticking to the sprocket. Certain of the rubbers and some plastics if "frosted," or etched, have such properties. A proper balancing of inherent curling, roll adhesion, sprocket tooth relief towards the addendum, and nip can approximately restore the normal tendency of the flexible sheet to follow the normal path of coincidence to the common tangent. This balance can be readily obtained for short distances. Observation and experience indicate that such distances are of the order of several times the tape thickness. It therefore follows that the aforementioned doctor blades can be separated from the rolls an amount corresponding to about 1½ to 2 times the tape thickness; and, further, the common tangent of the feed rolls should coincide with the center of the sensing chamber (or punching chamber). In practice, the doctor blades can approach the sprocket to within about ½ to ¾ of the tape thickness as is specifically shown in Fig. 29. This obtainable approach is desirable for slight imperfections and small burrs will then have a less unbalancing effect upon the normal tendency of the tape to coincide with the common tangent. In general, it is usually desirable that the punching chamber should be narrower than the sensing chamber, particularly along the zones where the tape is stripped from the punches in order to avoid noticeable ridges or burrs about the freshly punched holes. Such choking is shown in Fig. 29 where the mentioned zones have the form of mesas in the vicinity of the punches. This desirable end may be attained by requiring the stripper plate to have only a small clearance with respect to the punches. This end can be readily attained by making the stripper plate and the die plate as duplicates.

Figure 27:
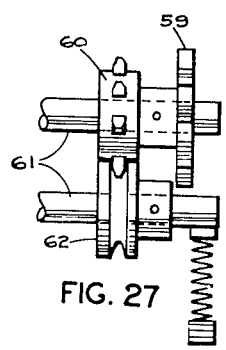
Fig. 27 is a fragmentary side view of a tape feeding sprocket and presser roll of the type shown in Fig. 12.

The desired nip between the rolls may be obtained in any convenient manner. Preferably, the nip should be adjustable in the process of manufacture. Usually, it is not necessary to vary the nip after assembly testing. One simple method of obtaining the desired nip is illustrated in Fig. 27. A spring well is provided in the plate $a$, and spider frame $e$, for the said spring. A manufacturing adjustment is shown as a small stack of disks at the lower end of the spring.

If the flexible sheet is very wide, it is sometimes desirable to provide some convenient roll with a double worm. This expedient is common in many arts, and it is not specifically shown. When it is desirable to provide such a double worm, it may be placed upon the rolls 47. As is well known, such worms tend to prevent the formation of wrinkles, thus keeping the flexible sheet smooth at all times.

Figure 30:
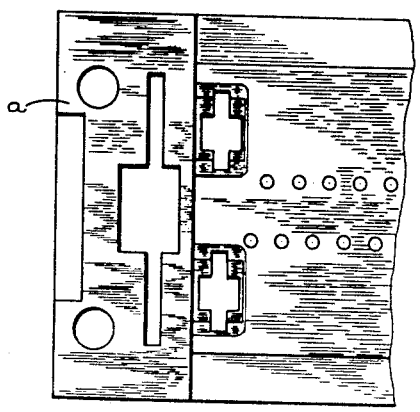
Fig. 30 is a fragmentary view of one of the plates of either a sensing chamber or a punching chamber showing certain of the refinements of Fig. 29.

The foregoing description of doctor blades, clearances, punching mesas, bearings for shafts 60, dowel holes, bell mouth, tapeway limits, etc., makes the tape chamber plates surprisingly complicated. A view of a fragment of one end of a tape chamber plate is shown in Fig. 30. These complexities are so great that manufacturing economies demand that these elements be either forgings (particularly for punching) or die castings (particularly for sensing). Although these elements have many irregularities or low mesas, they are simply produced by either process.

Figure 25:
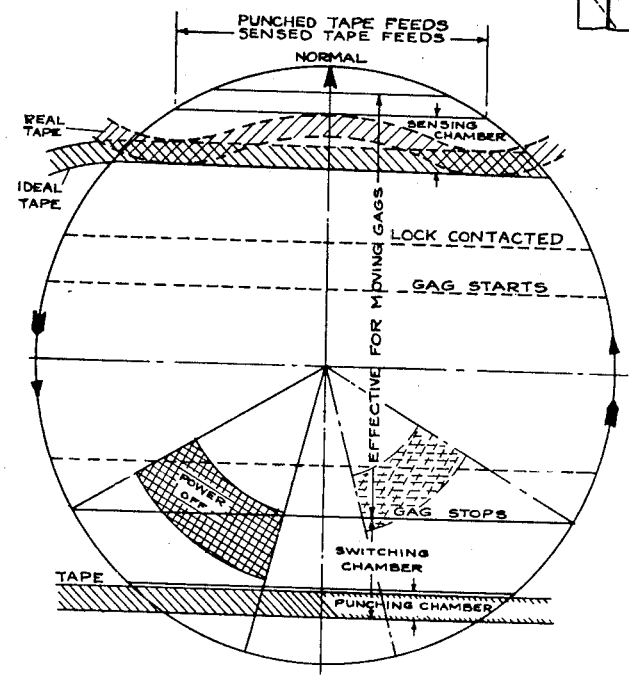
Fig. 25 is a conventionalized timing diagram for machines constructed in accordance with this invention.

If the inherent curl of the tape is positioned as indicated in Figures 14 and 15, the tape will tend to "hump" away from the sensing pins, particularly at the center of the sensing chamber as shown to an exaggerated degree in Fig. 25. Advantage can be taken of this tendency, for the sensing pins which will fail to find a perforation will be stopped slightly before they would be if the tape closely hugged the upper wall (Fig. 25) of the sensing chamber, thus assuring the initial contact of elements 80 and 81 (see Fig. 13), as will be more particularly described later.

When the teeth of the sprocket are foreshortened as indicated in Fig. 29, they may serve the additional function as aligners when in the position shown. When the tape is aligned, it should not be constrained by friction. This end may be admirably served by forming a clearance at the base of each tooth as shown in Fig. 31, and also flattening the cooperating roll 62 at the brink of the depressions. The same end may be achieved by the use of proper cams (not shown) fixed to the shafts 61 so that said shafts are slightly separated when members 60 and 62 have the position shown in Fig. 31.

SENSING UNIT

The function of the sensing unit is to obtain mechanical displacements isomorphic with the arrangement of perforations in the tape being sensed. Thus, if the arrangement of perforations identified as 9 is sensed, then there are some mechanical displacements corresponding to the object part of the arrangement identified as 9 and some other mechanical displacements corresponding to the specter part of the said arrangement—and these two species of displacements are interrelated as object and specter. A similar arrangement must exist for each and every possible combination of objects and specters. It is reasonable to infer that the sensing mechanism can consist of a positive linkage when an object or its specter always appears on the tape. This inference is correct, as may be seen by reference to the cited Kalkulex applications and as will be clearly seen in the detailed description which follows.

Figure 17:
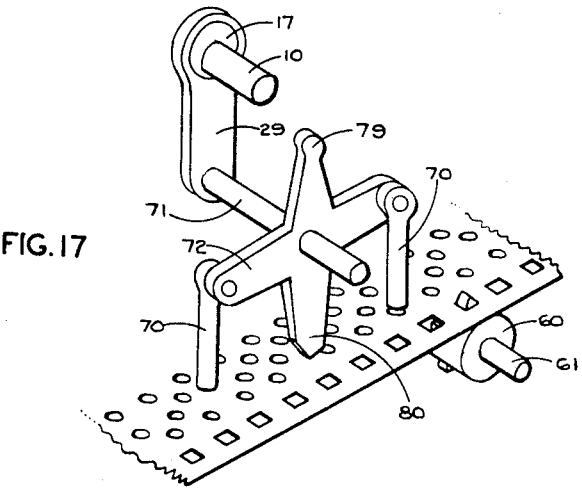
Fig. 17 is a highly diagrammatic view showing a pair of sensing pins in normal position, whereby the tape may be fed without interference.
Figure 18:
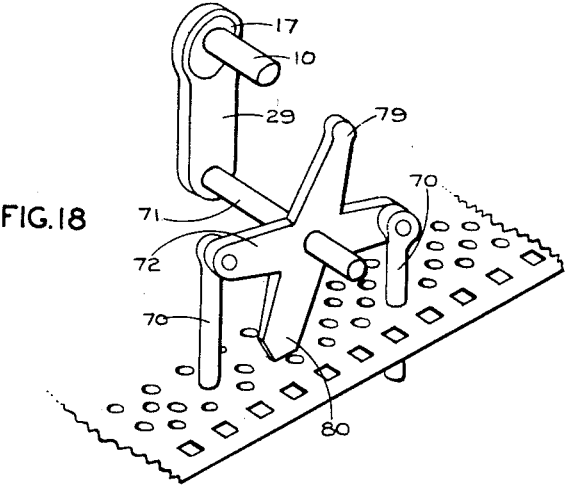
Fig. 18 is a diagram similar to Fig. 17 showing one of the two possible positions of the sensing pins during sensing.
Figure 19:
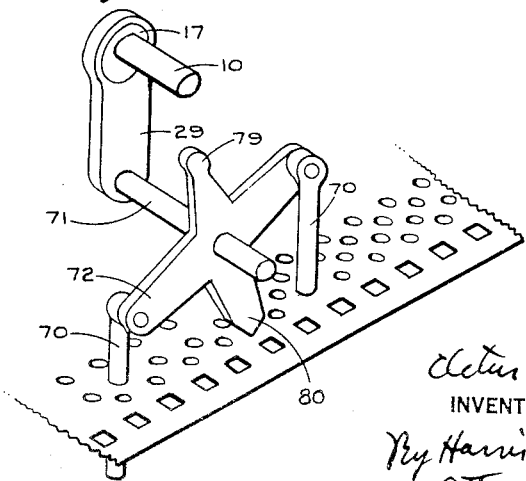
Fig. 19 is a diagram similar to Fig. 18 showing the other possible position of the sensing pins during sensing.

The operation of the sensing mechanism and its isomorphic relation to the perforations in the tape can be most readily understood from the schematic diagrams of Figures 17, 18, and 19. In Fig. 17, there is shown a schematic arrangement for sensing a single set of perforations. (See Figures 5, 6, and 7 for an identification of a set of perforations.) The sensing mechanism for each set of perforations consists of two interconnected sensing pins, or needles, 70; the one pin, 70, is arranged to sense the presence of an object (say) and the other pin, 70, is arranged to sense the specter of the object. The two pins 70 are positively connected together by a rocker 72 mounted on a shaft 71. The shaft 71 may be reciprocated by a suitable link (or pair of links, as in Fig. 9) by rotating the main shaft 10 (or 11 as the case may be). It will be recalled that the main shaft 10, or 11, as the case may be, has rigidly attached thereto an eccentric 17 for reciprocating the sensing carriage through the link 29. This mechanism has been highly conventionalized in Figures 17, 18, and 19 for more clearly illustrating the mode of a sensing operation. The practical mechanism corresponding to these elements is fully shown in Figures 9, 12, and 13. When the shaft 10 (or 11) turns through a half revolution, the shaft 71 is lowered, and the rocker 72 is correspondingly lowered—one of the pins 70 finds a perforation, but the other does not, so that the rocker 72 is turned through an angle corresponding to the described arrangement of the perforations. From the foregoing description, it is seen that the sensing mechanism is of extreme simplicity and that it is composed of positive mechanical linkages. This is an extreme contrast to the complications of the prior art record sensing devices. Typical examples of prior art record sensing mechanisms are shown in the patents Goldberg 1,694,009, Pierce 1,219,765, and Lascar 2,044,119.

Figure 20:
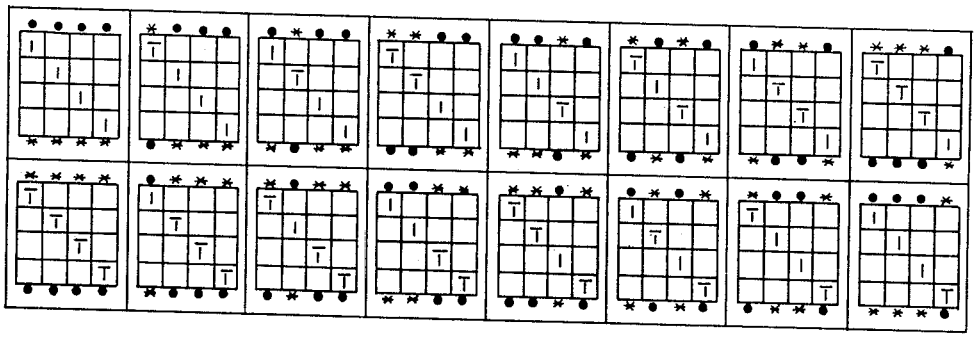
Fig. 20 is a conventionalized representation of a sixteenth order Abelian group which is isomorphic with the adopted perforation system of the tape as well as an isomorph of the differing positions of the sensing pins of the electric currents in certain circuits, etc.

The mechanical isomorphism with the arrangement of perforations in the tape is strikingly evident. If Fig. 18 represents the mechanical position of rocker 72 corresponding to an object (or specter, if one so chooses), then Fig. 19 represents the mechanical position of the rocker 72 corresponding to a specter (or object if one so chooses). The position of rockers and sensing pins, Figures 18 and 19 are mutually related as object and image when viewed in a mirror perpendicular to the tape which passes through the center of shaft 71. It is not improper to view Fig. 18 as representable by the symbol 1 (or $\bar{1}$ if one elects), then Fig. 19 is representable by the symbol $\bar{1}$ (or 1 if one so elects). Such a representation can be viewed as a first order matrix representation of the perforation arrangement of a single set. There are two and only two possible representations, viz., 1 and $\bar{1}$. Suppose four sets of perforations are regarded as an entity, then the number of arrangements increases considerably. All of the possible arrangements, with the convention that Fig. 18 represents 1 and Fig. 19 represents $\bar{1}$, are shown in Figure 20. Each square in Fig. 20 is properly interpretable as an orthogonant, and there is an isomorphism between the sixteen matrices of Fig. 20 and the symbols of Table A (see also Figures 6 and 8). It has just been shown that there is an isomorphism between Figure 20 and the possible arrangements of four rockers 72 when sensing four sets of perforations. This is another proof of the isomorphism set out in Table B.

It is now clear that for any admissible arrangement of performations in the tape, there is a corresponding arrangement of angular positions of the elements 72, and this correspondence is most accurately and tersely described by the well understood and common single technical term "isomorphism."

The details of the actual mechanism in use for effecting the establishment of a mechanical isomorphism with admissible tape perforations is shown in Figures 9, 10, 12, and 13.

Each sensing pin 70 takes substantially the form of a Greek cross 75, of sheet metal, having a wide opening for clearance about the supporting shaft 71. The upright portion of the said Greek cross can slide vertically in grooves 77 (Fig. 21) in the carriage casting 30 and thus assure a limited amount of relative vertical motion for each of said Greek crosses 75. One of the horizontal arms of each Greek cross 75 is provided with a notch 73 near the extreme end. The extreme end of each Greek cross horizontal arm is provided with vertical fingers 74; and these fingers are arranged to slide in grooves in the casting 30 also. The rocker 72 also has the form of a slender Greek cross—its horizontal arms terminate in off-set trunnion disks 78 and each disk 78 fits into the above mentioned notch 73 of a pair of sensing fingers 70, thus providing the above described positive connection between the sensing pins. The kinematical arrangement just described is mechanically identical with the diagrammatic arrangements shown in Figures 17, 18, and 19. Each rocker 72 is provided with a suitable hub through which passes the shaft 71 which in turn is supported at its ends by the carriage casting 30. The downwardly extending vertical arm of the rocker 72 is also provided with a disk 79 whose function will be described under the title headings "Gag carriage" and "Transsetters."

Embedded in the casting 77 are four spring pressed plungers 79. Each plunger 79 is sufficiently large to contact the edges of both the object and specter sensing Greek crosses 75 which correspond to a set of perforations in the tape. It is easy to see that the combination of two members 75 and the rocker 72 comprises a resilient arrangement similar to that of the familiar double swinging door. When the combination of members 75 and 72 are in the position corresponding to Fig. 17, the said spring plungers will hold the rockers 72 and members 75 in a predetermined position, due to the initial compression of the plunger springs. The construction and arrangement is such that the tips of the sensing pins 70, which contact the tape, are in a plane parallel to the plane of the sensing chamber and a short distance below said sensing chamber so that in the described position, the sensing pins are not contacting the tape. The sole and only function of the said spring plungers 79 is that of centralizing the described assembly, and therefore these springs are very light and the initial compression of each is very small. Four of said plungers 79 are used to preserve both geometrical and mechanical symmetry.

The upwardly extending arm of the rocker 72 terminates with a blunt wedge 80; and said end 80 of each rocker is adapted to cooperate with a rigid wedge bar 81. The construction and arrangement is such that when the assembly of two members 75 and rocker 72 are in the described centralized position, the points of the rocker arm wedges 80 and the fixed wedge 81 lie substantially in a plane which passes through the center of the shaft 71 and is perpendicular to the plane of the sensing chamber. The said points of the wedges 80 and 81 are also separated by a predetermined distance which is largely determined by the exigencies of manufacture and the average thickness of the tape being sensed. When the shaft 71 is moved upward, the assemblies consisting of members 75, rockers 72, and the carriage 30, move as a fixed or rigid unit because of the aforementioned centralizing effect of spring urged plungers 89; when one of the sensing pins finds a perforation in the tape, the other is held up (i.e., arrested) so that the rocker 72 begins to rotate. When the rocker 72 has turned a predetermined distance, the wedges 80 and 81 contact, and these wedges remain in contact for the greater portion of the rotation of the main shaft 10 (or 11, as the case may be). The included angle of the wedges 80 and 81 is such that the sensing pin which has not found a perforation is elevated slightly from the tape; obviously the other pin travels a correspondingly greater distance through the perforation than would otherwise be the case. This effect is clearly shown in Fig. 13 where it is seen that the end of the sensing pin which failed to find a perforation is at an appreciable distance from the tape (e.g., approximately the tape thickness). This construction and arrangement is an immense improvement over the prior art sensing mechanisms. In actual practice, an acetate tape having a thickness of about 0.005 inch and sensing pins having a tip diameter of about 0.030 inch were run through several hundred sensings—yet, there were no visible scars on the tape where the sensing pins failed to find perforations. This is a remarkable performance when it is fully realized that the speed of operation is between 3 and 4 times that ordinarily practiced with prior art machines such as that disclosed in the cited Lasker patent. Cards used in the prior art are more than half worn out when sensed as often as stated and furthermore, they markedly show "goose flesh pimples" at all places where a sensing pin failed to find a perforation even though the area of such sensing pin points is upward of four times that used with the device of the present invention. This result is even more spectacular when it is recalled that the tape used with the present invention is only about ⅔ as thick as the usual prior art cards and is characterized by brittleness rather than toughness. These spectacular results are largely due to the adoption of a sensing method which is an exact group isomorph of the system of perforations and to the proper utilization of the cooperating wedges 80 and 81. Experiments have shown that it is possible to correctly sense the tape when the sensing speed is upwards of ten times that commonly used in punched card practice. In contrast to the prior art, such speeds are fantastic, for none of these machines would last more than a very few cycles before breaking down.

It can be shown that the proper slope of the wedges 80 and 81 is that of a pair of mating involute gear teeth of high pressure angle. In the drawings, the said pressure angle is slightly in excess of 45°. Research has also demonstrated that other mating tooth curves (e.g., the cycloidal) are also suitable for use in this environment.

Figure 21:
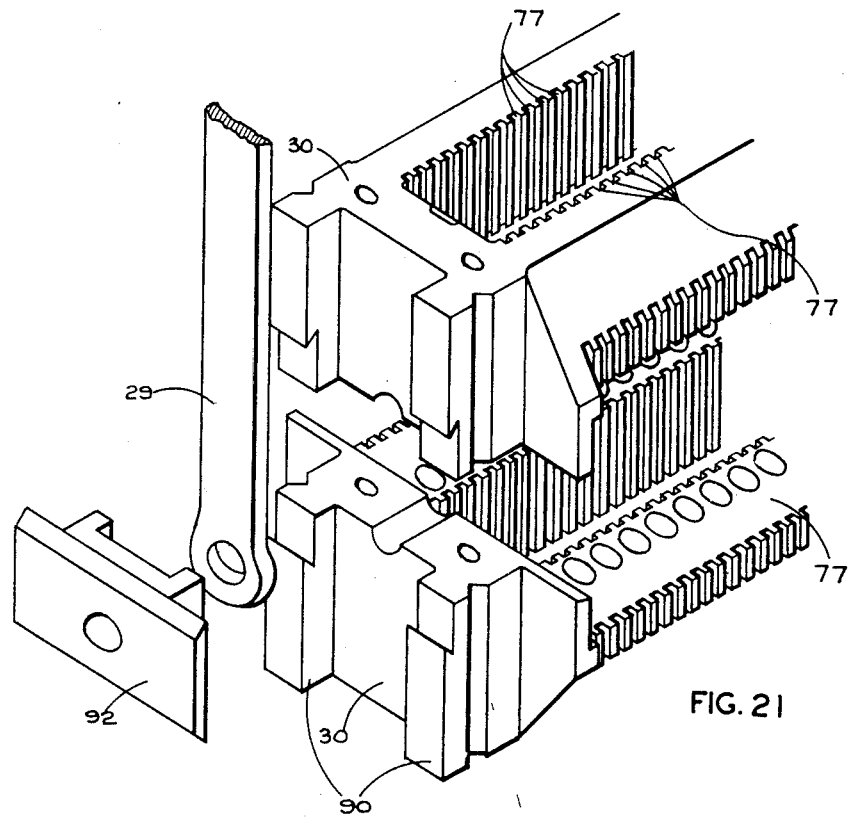
Fig. 21 is an exploded perspective view of fragments of the elements at one end of a sensing carriage showing the mode of assembly.

The carriage 30 is really an assembly of two identical cradle like parts as is best shown in Fig. 21. An excellent cross section near the middle thereof appears in Fig. 12 and a section near one end appears in Fig. 13. The two parts of the said carriage 30 are held together by four rivets (the holes for two of said rivets appear in Fig. 21) or other suitable fastening means to form a suitable framework for the above described sensing pins 70 and rockers 72 along with the supporting shaft 71 for the rockers 72 as well as the spring urged plungers 89. From Fig. 21, it is clearly seen that each end of the casting terminates in a pair of stout flanges 90, and that each stout flange 90 is provided with a suitable V groove. The purpose of this V groove is to form a ball or roller race for an antifriction sliding mounting. Bridged across the stout flanges 90 is a block 92 which serves as a connecting element between the sensing carriage castings 30 and the pitman 29 which is reciprocated by the eccentric 17 on the main shaft 10 (or the shaft 11, as the case may be). It will be recalled that the eccentrics 16 and 17 are separated by the Geneva driver 18. Advantage is taken of this spacing in forming the block 92 so that the pintle connection between the pitman 29 and the sensing carriage is supported at both ends as is clearly indicated in Fig. 9. The block 92 may have flanges fitting between the stout flanges 90 to the present longitudinal movement of said block 92, and said block is provided with vertical dovetails to obtain a rigid vertical assembly as an incident to the permanent assembly of the two castings forming the framework of the sensing carriage 30.

SENSING CHAMBER

The sensing chamber with the sprocket feeds for the tape through the sensing chamber has been briefly described under the heading "Looper"—a more detailed description follows. All tape chambers have substantially the same construction even though some are used for sensing and others are used for punching. This uniformity is indicated in Figures 1, 2, 3, and 5 by the conventionalization of a stack of three plates for each. As shown in Figures 12 and 13, both of said plates may be either castings or forgings. Each plate is provided with two long hemicylindrical depressions with a series of enlargements near each end for forming half of the recess for the tape feeding sprockets 60, their supporting shaft 61, and the Geneva star 69 as best shown in Fig. 30. The extreme ends of said depressions form the bearings for said shafts 61. The construction and arrangement is such that when two of said plates are put together with the assembly of shafts 61, Geneva star and sprockets 60, the requisite tape sprocket feeding mechanism is fully assembled, as is clearly shown in Figures 12 and 13. Usually the sprockets 60 are only half supported by said plate; the remaining half of the support appears in the bearing castings d as is clearly apparent in Figures 11, 12, and 13. Frictionally contacting the shrouds of sprockets 60 are the grooved friction rolls 62 best shown in Figures 27, 29, and 31. The said friction rolls 62 have grooves which clear the sprocket teeth and it is preferable that they be constructed of a material having approximately the properties of moulded rubber for use on cellulose acetate or like tapes. The object of rolls 62 is to insure a proper gear-and-rack cooperation of the sprockets 60 and the tape. The specific details of members 60 and 62 have been fully described in the article "Physics of Tape Feeding." At the place where the tape passes between the plates, there is an opening having a conspicuous bell mouthed entrance and a corresponding exit for the tape. Between the said bell mouths, the said plates are relieved to provide a tape chamber passage which has a clearance of about 2 to 3 times the tape thickness. Each tape chamber is provided with holes corresponding to every possible object perforation and also to every possible specter perforation. The specific construction in Fig. 13 shows two sets of perforations—two for each object position and two for each specter position. Only half of these are used for sensing, as shown in Fig. 13.

The sets of openings for the sensing pins in Fig. 13 appear to be very crowded. Reference to Figures 5, 6, and 8, however shows that the openings are staggered, for the apparently adjacent openings are object and specter positions. Those used in Fig. 30 correspond to the tape fragment of Fig. 6, and those not used in Fig. 13, correspond to the tape fragment of Fig. 8. When the tape chamber is used for punching, one pair of the sprockets 60 has not teeth (not shown), and, additionally, there is an opening for perforating the square feeding holes, as is clearly shown at the bottom of Fig. 12.

Openings between the ends of the shafts 61 are provided for the pitmans 17 and 19 to pass from the main drive shaft to the reciprocable carriages (see Fig. 30). Each tape chamber plate $a$, each main shaft bearing casting $c$, and each end of the fixed ball race castings $e$, is provided with dowel openings for holding the above described castings in aligned assembled position by means of the dowel bolts $f$, and/or $g$, as shown in Figures 1, 2, 3, 4, 9, and 29.

GAG CARRIAGE

The gag carriage 20 is normally located below the sensing carriage as is apparent from Figures 1, 2, 12, and 13. The gag carriage 20 carries a gag 100 for each *pair* of sensing pins 70, or what amounts to the same thing, a gag for *each* rocker arm 72; and further, each gag 100 is positioned by its corresponding rocker arm to gag, to enforce, the movement of an interponent member 102 such as a punch, a switch operator, a printing die or the like.

The gag carriage 20 consists of a cradle like frame having an external shape approximating that of the castings of the sensing carriage 30. The upper end of the frame consists of a shrouded comb for guiding the extreme ends of the gags 100, so that they will be confined to a rectilinear motion relative to the gag carriage frame 20. The gags are held in place by a formed sheet metal cover 103 which in turn is suitably affixed to the frame 20. The said cover 103 has an opening in its central portion which permits the bifurcated ends of the gags 100 to project through so that the rounded end of the rocker arm 72 will be located in the mentioned bifurcated portion, as is most clearly shown in Figures 12 and 13. The lower edge of each gag is provided with a depression or notch, the construction and arrangement being such that when a gag is in the position shown in Fig. 13, one of the interponent members 102 will be gagged against movement relative to the frame 20, whereas the companion interponent member 102 will be free to move relative to said frame 20, if it should meet an appreciable resistance. The extreme upper ends of the interponent members 102 are guided by suitable openings in the web of the frame 20 as is clearly shown in Fig. 13. The frame 20 carries a perforated plate 104 at its extreme lower end, which limits the extent of relative movement of said interponents 102 by virtue of the confined collar 103 integral with each interponent member 102. In order to insure free movement of the gags 100 during a portion of the operating cycle, there is a perforated stationary plate 105 located so that the said collars 103 may be forced into substantially a common plane by virtue of the movement of the gag carriage 20. The said perforated plate 105 is rigidly mounted on bars 106 which in turn are fixed to the side frames $e$ as shown in Figures 12 and 13.

From the foregoing description, it is apparent that one of the interponents 102 will be forcibly carried by the frame 20, due to the position of the gag 100, whereas the other will remain more or less at rest, particularly so if it meets an appreciable obstruction. Advantage is taken of these facts to enforce some desired function on the part of the interponent 102. Examples of such functions are the punching of a tape, the closing or opening of switches, printing or stamping indicia, etc.

A strict following of the Kalkulex construction would require that the interponents 102 be connected by a rocker as in the case of the sensing pins 70. Such a construction would positively prevent double punching. Ordinarily, this refinement is not necessary; however, it appears in an elementary form in the switching mechanism described later.

Under the title, "Sensing carriage," it was shown that the rockers 72 attain positions which are isomorphic with the Abelian group, which in turn is an isomorph of the group of the system of perforations used in the tape. Since the gags 100 are moved by said rockers, they in turn attain positions isomorphic with the same group. Further, the selection of the interponents 102 for effective operation is determined by the said gags 100. It follows that the effective operation of said interponents 102 is also isomorphic with the same group. Obviously, this isomorphism is necessary to effect a duplication of a given tape or to convert the arrangement of perforations into switch operations and thence into electric currents, or the like.

SWITCHING MECHANISM

In the case of a senser as contrasted to a punch, the gag carriage interponents 102 open and close switches so as to obtain an electrical isomorph of the complete residue system of Table B. Under the heading of "Gag carriage," it was shown that the interponents 102 attain positions isomorphic with a bioctagesimal Abelian group and also with the complete residue system (modulo 16). It should therefore be a simple expedient to cause the said interponents 102 to actuate switches. It will be pointed out under the heading "Evaluator" that a number of electrical isomorphs of the complete residue system (modulo $2^n$) can be readily attained, particularly in the case of appropriately designed networks. The switching mechanism now to be described is the final connection between the purely mechanical apparatus and the electric circuits.

Figure 11:
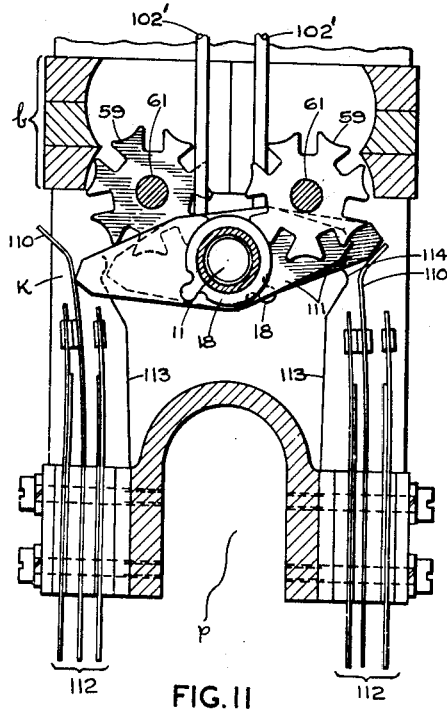
Fig. 11 is a fragmentary irregular section showing the arrangement of tape driving sprockets and the switch operating mechanism of a tape senser.

Generally, the switching mechanism consists of a suitable frame for supporting suitable switches, as for example, the leaf spring type common in the communication art, levers for operating the said switches, and finally, a terminal board. The frame may take the form of a frame $k$ located between a pair of the frames $d$ to serve as an anchorage for the switches, as shown in Figures 9 and 11. For purposes of illustration, the switches are shown as double throw single pole assemblies for the circuit of Fig. 24. It is to be understood that any desired number of poles may be used, or that combinations thereof may be used so that the switching required for any of the described electrical evaluators may be effected.

The switches are secured in any suitable manner to the support k, and their tongues 110 lie in proximity to the switch levers 111 so that the rocking of a said lever 111 from one allowable position to the other allowable position results in the actuation of the switch contacts.

The levers 111 are loosely mounted on a suitable frame supported shaft 11 (said shaft 11 is ordinarily a drive shaft also as described hereinabove), and each lever overlies the two interponents 102 of a pair of interponents so that one of said interponents 102 will rock the lever 111 to effect the completion of the object circuit (or if one pleases, the specter circuit), and the other interponent will by rocking the lever 111 in the opposite direction, effect the completion of the specter circuit (or if one pleases, the object circuit). It will be recalled that the two interponents 102 are moved by the gag carriage 20 as has been fully described under the heading "Gag carriage."

The terminal board may be affixed at the bottom of the frames k, or it may be in the form of a deep groove p, in the said frame k. It is to be understood that suitable cables may be electrically connected to the switches 112 through the terminal board. The actual physical connections are not shown in Figures 9 and 11 for they are shown to considerably better advantage in Figures 21, 23, and 24 for several types of electrical evaluators.

The levers 111 are provided with noses at each end as is best shown in Fig. 11. One of said noses is used for shifting the switch tongues 110 as above described, the other may be used as a lock. A leaf spring 113 is attached at the bottom of the switch stack, then extends upwardly, where it terminates in a spring lock 114 for cooperating with the nose on the end of the shorter arm of the lever 111. In practice, it has been found that these latches are not actually necessary, for the switch tongues can be provided with a slight corrugation.

To recapitulate: for any allowable position of the sensed tape, the rockers 72, due to the coaction of the sensing pins 70 and the tape, take displaced positions isomorphic with the sets of perforations sensed. The sets of gags 100 take corresponding isomorphic positions because of the coaction of 79 with the gag tines. The sets of interponents 102 also take corresponding isomorphic positions, and so do the sets of switch rockers 111, thus opening and closing the sets of switches 110—112 to obtain electrical currents isomorphic with the tape perforations, it being understood that there is a set of switches 110—112 corresponding to each set of perforations. This correspondence of perforation sets and switch sets is most clearly brought out by the corresponding legends Set 1, Set 2, Set 3, and Set 4 of Figures 5, 6, and 23.

EVALUATORS

Figure 22:
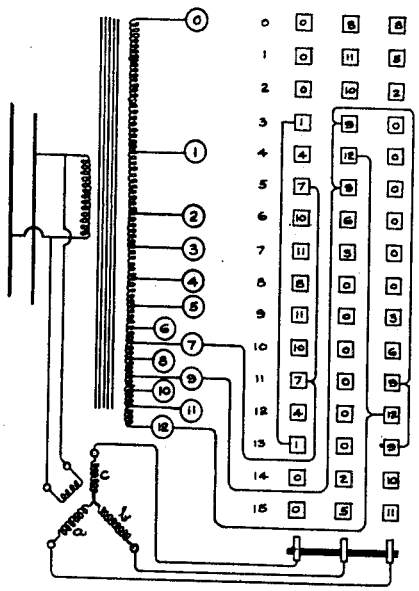
Fig. 22 is a schematic circuit diagram of a polyphase selsyn connected to a gang switch which switch in turn has its contacts connected to taps on a single transformer, some only of the actual connections being shown; nevertheless, an obvious key, or code, clearly indicates the complete connections.

The cited Kalkulex applications disclose several varieties of purely mechanical evaluators. Herein, it is convenient to use electro-mechanical congruence evaluators rather than purely mechanical evaluators. Advantage is taken of the well known property of self synchronous devices (e.g., the familiar devices known by the short and euphonious name of "selsyns") for constructing simple congruence evaluators. An interesting and instructive schematic circuit is shown in Fig. 22 which represents a single phase transformer with multiple secondary taps connected through a suitable conventionalized rotary switching mechanism to the polyphase windings of a selsyn motor. Only a few of the connections between the switch points and the transformer secondary are shown, for to show all of them would result in a very complicated wiring diagram. Each of the transformer taps is suitably identified and the switch contacts connected thereto are correspondingly identified. This convention results in a very simple diagram. In the particular example shown, the switching mechanism can make 16 separate and distinct steps before returning to a preselected normal position. When the three point rotary switch is turned, the selsyn motor, when connected to a suitable dissipative load, will turn one sixteenth of a rotation with each step of the said rotary switch from triad of contacts to triad of contacts; and this operation occurs irrespective of the direction of rotation of said rotatory switch. The operation of this mechanism may be briefly described as—the selsyn motor always keeps in step with the rotary switch. The mode of operation is as follows: for the sake of definiteness, let it be assumed that the rotary switch is on the points marked 5—then the selsyn rotor is in a corresponding position. Referring to Fig. 22, it will be seen that phase c is connected to tap 7, phase b is connected to tap 9, and finally phase a is connected to tap o. A like arrangement obtains for each of the sixteen possible connections. The voltage across the secondary of the single phase transformer connected to phase a is that which is induced in this phase when the selsyn rotor is turned to the angular position corresponding to position 5 of the switch; again, the voltage across the single phase secondary of the transformer connected to phase b is that which is induced in this phase when the selsyn rotor is turned to the angular position corresponding to position 5 of the switch; and finally, like voltage relations exist for the remaining phases of the polyphase windings of the selsyn. When the rotary switch is moved to another position, like voltage relations exist. The net result is that the combination of the single phase transformer and rotary switch acts as if it were a selsyn generator at the angles corresponding to the switch points. It should be noticed that the described combination simulates a selsyn generator at certain points only, and these points are those corresponding to the transformer secondary voltages. The device just described is a beautiful laboratory model and serves excellently to demonstrate the principles enunciated hereinabove. It is, however, not well suited for practical operation because of the very large number of contacts involved in the rotary switch. It is also worth noting that the transformer taps need not correspond to aliquot parts of a complete rotation; they may be purely arbitrary and the described relations will obtain. The connections shown in Fig. 22 comprise only one of a large number of arrangements which will operate as described.

Figure 23:
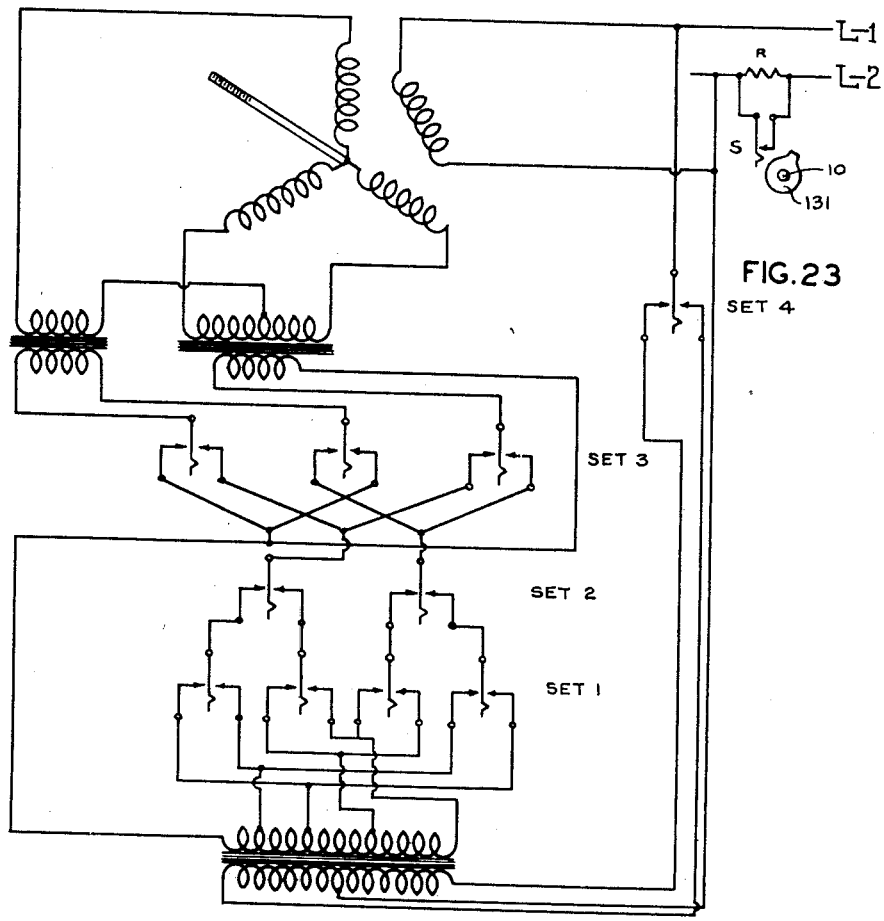
Fig. 23 is a schematic circuit diagram of a polyphase selsyn connected to single phase transformers which is isomorphic to the diagram of Fig. 22.

An evaluator having substantially the same characteristics as that just described is shown in the schematic circuit of Fig. 23. The difference between the two lies primarily in the enormous reduction in the number of switches, the identification of the switches with the Abelian group isomorph 7 of Table B, the existence of some parasitic currents, and finally, the use of two transformers instead of one. It is easy to show by means of simple calculations that the voltages induced across the polyphase terminals of the selsyn motor are:

$$V_{a-b} = 3/2\left(\cos \phi + \frac{\sin \phi}{\sqrt{3}}\right)$$

$$V_{b-c} = 3/2\left(-2\frac{\sin \phi}{\sqrt{3}}\right)$$

$$V_{c-a} = 3/2\left(-\cos \phi + \frac{\sin \phi}{\sqrt{3}}\right)$$

where $\phi$ is the angle of the axis of the rotor with respect to a standard position. A brief study of the diagram shows that it comprises four parts, viz.:

(1) The selsyn motor.

(2) A transformer with plural secondaries whose secondaries are connected "Scott T" with single phase primaries.

(3) A switching mechanism.

(4) A single phase power transformer with a multi-tapped secondary.

When compared with Fig. 22, it is seen that there are only 4 taps on the secondary instead of 12.

The electrical construction of the selsyn motor is well known and is sufficiently disclosed in Fig. 23. The second part may take the form of an ordinary shell transformer with the "sine" coil on the center leg (i.e., the coil that supplies selsyn voltages corresponding to the sin $\phi$ part of the voltages in the above expressions for the selsyn terminal voltages), and with the "cosine" coil (i.e., the coil that supplies selsyn voltages corresponding to the cos $\phi$ part of the voltages in the above expressions for the selsyn terminal voltages) divided into two parts, one part on each of the outside legs of the core; or vice versa, if desired. It is, of course, possible to use separate transformers, one for the "sine" portion and the other for the "cosine" portion. It is worth noting that the "cosine" portion has a ratio R and the "sine" portion has the ratio $$\frac{R}{\sqrt{3}}$$

where R is any desired number. For experimental purposes, R has been chosen as unity. In any event, R must be such that there is a voltage match between the power transformer and the selsyn terminals.

The power transformer is shown as an ordinary single phase transformer with a double voltage center tapped primary and a secondary with three taps between the ends. In the present case, the angle $\phi$ may take any of the sixteen angular values corresponding to the sixteen different values of the complete residue system (modulo 16) which is identified in Table B as isomorph 8. The taps on the secondary of the power transformer are:

sin 11¼°=cos 78¾°=voltage from common to first tap
sin 33¾°=cos 56¼°=voltage from common to second tap
sin 56¼°=cos 33¾°=voltage from common to third tap
sin 76¾°=cos 11¼°=voltage from common to fourth tap for these values are consistent with the first quadrant of the complete residue system (modulo 16) viewed as an angle measurer. The second quadrant is adequately represented by the primary connection to the "cosine" portion of the transformer adjacent to the selsyn motor, and finally, the last half of the said group is obtainable by reversing the primary of the power transformer. It is easy to make the one to one correspondence of the switching mechanism and the cited complete residue system; this has already been done above according to the method of groups. The method of making the one to one correspondence consists merely in tracing the possible circuits by actuating the switches in all possible combinations and keeping note of the terminal voltages. One contact position of the switches, say towards the left, may be identified as the object position, and when all switches of the four sets are in this position, the initial value of $\phi$ is fully determined. If this is a position where the selsyn motor has no torque (i.e., when the currents in the polyphase winding of the selsyn are of minimum magnitude; theoretically this minimum magnitude is zero), then $\phi$ may be chosen as zero and the position identified as the initial or start position. The voltages and currents in the circuits are then viewed as the object voltages and currents. When one or more switches of the four sets of switches are contacting towards the right, these switches are viewed as being in the specter position and the corresponding voltages and currents may be properly identified as specter voltages and currents.

This system has been in experimental use for some months, and gives excellent results. This system is prone to cause the transformers to heat, particularly if they have very low resistances because of the existence of parasitic circulating currents. This system is also characterized by having somewhat larger piles of switch contacts than desirable for practical operation; thus switch set 1 has four tongues 110 and eight contact leaves 112, and set 3 has three tongues 110 and six contact leaves 112; these stacks of switches are large enough to be somewhat troublesome from the standpoint of service.

Another evaluator having approximately the same electrical characteristics, but without parasitic circulating currents, is shown in the schematic diagram of Fig. 24. Again, the diagram can be divided into exactly the same four components as Fig. 23. In this case, the switch set 4 is used for reversing the current in the single phase coil of the selsyn instead of in the primary circuit of the power transformer. This circuit is based upon the approximate equality where $$\omega+\omega^7=\omega^3+\omega^5$$

where $$\omega=\cos\frac{\pi}{16}+j\sin\frac{\pi}{16}$$

that is, $\omega$ is one of the complex thirty-second roots of unity. This equality is not exact, yet it is sufficiently exact for practical purposes. The transformers of Fig. 24 may be magnetically the same as those of Fig. 23, but the electrical connections are somewhat different. Each set of switches merely reverses the windings of a secondary coil. If switch contact positions towards the left are viewed as the position corresponding to object voltages and currents, then the contacting position towards the right will correspond to specter voltages and currents. The circuits can be readily traced and the final voltages across the selsyn motor terminals will be correct within the limits of the above approximate equation connecting certain of the thirty-second roots of unity. This system from the standpoint of switch contacts involved is considerably simpler than any of the preceding circuit systems.

The evaluator systems shown schematically in Figures 20 and 24 suffer from the considerable disability of being applicable only to complete residue systems having a modulus of 16 or less. It is accordingly desirable to have recourse to a system which is not so limited. It is also desirable to have a simpler mechanical switching system associated therewith. These improvements are fully disclosed in another application for patent.

TRANSSETTERS

The mechanisms disclosed herein are Kalkulex mechanisms; they are among the simpler types of degraded symmetry—nevertheless, many of the differing Kalkulex components and Kalkulex units appear in various readily recognized forms, as has already appeared hereinabove. In the cited Kalkulex applications, the transsetters take the form of sets of pairs of complementally movable elements which are temporarily locked when the extreme positions of the main operating mechanism are attained. Herein, the transsetters are of extremely elementary form, and have already been fully described in connection with the sensing mechanism. The transsetters consist merely of the arms of the rocker 72 which set the gags 100 (Figures 12, 13, and 9), and also the conductors which connect the sets of sequence switches to the evaluator, as has already been described in connection with the evaluator. When the sensing carriage is at normal, that is, when the sensing pins 70 are free of the tape, the transsetters are resiliently locked in normal position by means of the spring urged plungers 79. The transsetters may be rigidly locked in normal position if desired by means of a pair of bumper bars 101 (Fig. 13) attached to the frames e, for when the sensing carriage reaches normal position, the ends of both the Greek cross frames 75 connected with the pair of sensing pins 70 will contact said bumper bars 101, thus locking the rockers 72 in centralized position. The use of the bar 101 permits an enormous decrease in the strength of the springs 79, for it is only necessary that said springs have sufficient strength to overcome inertial unbalance of elements 72 and 75. It has already been pointed out that the wedges 81 cooperate during the reciprocatory movement of the sensing carriage 30 and the cooperating locks 80 and 81 form a generous positive lock at the other extreme of movement as shown in Fig. 13. Under the heading of "Switching," it is recalled that the various switches are resiliently locked in either open position of closed position by suitable switch actuating mechanism such as the levers 111 of Fig. 11, whence it can be properly said that the transsetting wires have definite currents locked therein. It is accordingly seen that the transsetters herein have all the characteristics of the transsetters fully described and shown in the cited Kalkulex applications.

MASTER SWITCH

The switching from one perforation combination to the next can be theoretically accomplished so that all old contacts are broken simultaneously, and all new contacts made simultaneously. In practice, this ideal is not readily accomplished, for some contacts will operate first, and others will operate last. Similarly, there may be a slight difference in the timing of the switch closing. As an example, let it be supposed that the contact that is in a closed circuit is the one identified as 15, and that the next contact to be completed is the one identified as 0. Let it be supposed that the contacts corresponding to set 4 breaks first (it being tacitly assumed that all other sets remain closed); at this instance, the 15 changes to 7, which is almost diametrically opposed to the new set. Let it be supposed that the set 1 contact breaks, then the momentary 7 is changed to 6. Now, suppose that the third set breaks, then the contact arrangement changes to 4, then finally the desired 0 arrives.

Many other anomalous conditions can be easily attained by imagining other orders of the breaking of the switches. To avoid these undesirable permutations, a master switch is inserted in the main supply circuit so as to insert a fairly high resistance into the power supply line prior to the changing of the contacts; and, after the change has been made, the said switch is closed to remove the said high resistance. This simple arrangement permits the changing of circuital permutations with a minimum of heavy power fluctuations.

These ends may be readily accomplished by inserting a suitable circuit element R such as a resistance or the like into one of the power lines, as for example L-2 in Fig. 23. During the main part of the rotation of the main shaft 10, the element R is shortcircuited by a closed switch S, but at the time that the switches corresponding to the perforation sets are to be permuted, the switch S is opened by a cam 131 mounted on the main shaft 10 (see Fig. 9), thus inserting R in series with the circuit supplying the transformers and selsyns. After the switch sets are completely permuted, the switch S is closed, thus shortcircuiting the element R. It is to be understood that circuit element R may be any suitable device for reducing the power flowing through the system. Thus, R may take such forms as a mere resistor, a choke in series with a resistor, a saturable reactor, or the like. If the element R is a saturable reactor, it is understood that the switch S controls the saturating winding by inserting a resistance or the like therein. At times, it may be desirable to use a more elaborate system such as that shown in Fig. 24 where the element R is broken into parts R1 and R2, each with a separate switch S1 and S2 respectively. Each of said switches S1 and S2 is controlled by a suitable cam on the main shaft 10. In this case, it is desirable to open S1 first, then open S2, then close S2, then finally close S1. Such a program can be easily effected by cams effective for differing periods as is diagrammatically indicated in Fig. 24.

Figure 26:
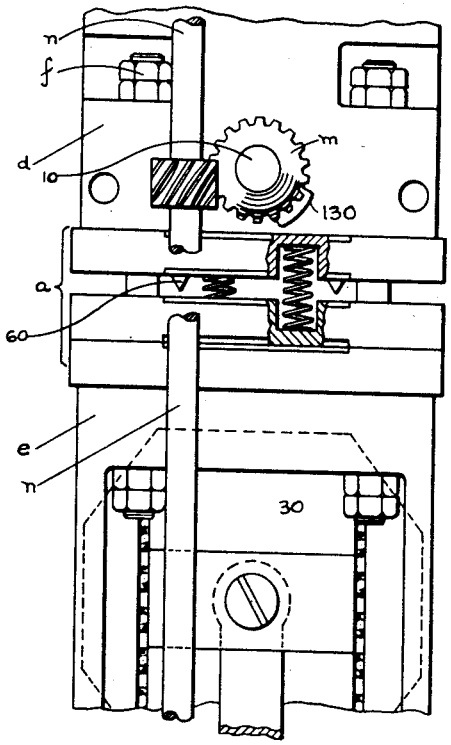
Fig. 26 is a fragmentary end view of a machine having certain features which may at times be desirable.

The mechanical apparatus associated with the switch S or the switches S1 and S2 is shown in Figures 9 and 26. The spiral gear p fixed to the main shaft 10 has an arcuate groove having a length of about 240° to form an idle path for the pin 130 fixed to the switch-actuating cam 131. The cam 131 is loose on the main shaft 10 and is driven by the pin 130 fitting in the slot in the gear p. The active projection on the cam 131 is about 36° to 45° in length so that the element R is in the circuit about $\frac{1}{10}$ to $\frac{1}{8}$ of the time. If the main shaft 10 is driven from both ends simultaneously, the described switch-operating mechanism is duplicated at the other end of the main shaft 10. The duplication is exact, except that one of the cams is active for approximately half of the time and then the other is active, thus effecting the particular switching program mentioned in the preceding paragraph, and as shown diagrammatically in Fig. 24. The long arcuate slot in the gear p permits a lost motion of about $\frac{2}{3}$ of a rotation of the main shaft. This lost motion comes into play when the direction of the rotation of the main shaft is reversed so that the time of operation of the switch S or the switches S1 and S2 always occurs in the correct portion of the operating cycle as is set forth in more detail under the article "Timing." The effect of said slot is indicated in Fig. 25 where there is a sector identified as "power off"; this sector corresponds to the time the master switch S is open when the main shaft is rotating anticlockwise. There is also a phantom sector shown in Fig. 25 having a position corresponding to a mirror image to the sector "power off"; this mirror position corresponds to reverse rotation of the main shaft 10, and it is attained as an incident to the existence of the described slot construction.

TIMING AND CONTROL

The timing cycle of the machines disclosed, in common with all Kalkulex machines, is very simple, and the number of auxiliary cycles is small. The principal elements governing the timing are on the main shaft; further, nearly all of the motions are continuous or substantially continuous with relatively few intermittent motions as compared with prior art punched tape or punched card machinery. A conventionalized timing diagram appears as Fig. 25.

The continuous, or substantially continuous, motions (that is, motions that extend completely around the cycle) are:

(1) The operation of the looper, for the tape feeding rolls and tape reels are driven by an ordinary gear train (see Fig. 14) and therefore all these elements have a continuous motion. The rate of motion is such that the tape fed through the looper per rotation of the main shaft is equal to the distance between consecutive object (or specter) positions; this distance is also that between adjacent square perforations at the tape margins.

(2) The sensing carriage 30, as shown and described in detail herein (see Fig. 9), is driven by eccentrics 17 and pitmans 29; under these circumstances, the movement of the sensing carriage is continuous. If a cam were used instead of the eccentric, the motion would also be substantially continuous. The motion of the rocker arms 72 is substantially continuous, for each rocker arm 72 is moving and also rocking in the direction of Fig. 18, or Fig. 19, except for about 75° of the operating cycle when the said rocker arms are in the position of Fig. 17.

(3) The gag carriage 20, as shown and described in detail herein (see Fig. 9), is driven by the eccentrics 16 and pitmans 19; under these circumstances, the movement of the gag carriage is continuous. If a cam were used instead of the eccentric, the movement would be substantially continuous. The rectilinear movement of the gags 100 (see also Fig. 13) with respect to the frame of the gag carriage is doubly intermittent. The gags are relatively at rest until shortly after the rocker arms 72 begin to cant in one direction or the other (Fig. 18 or Fig. 19). Movement of the gags does not begin until after wedges 80 and 81 are in contact. This is indicated in Fig. 25 and identified as "Lock contacted." The prongs of the bifurcated portion of the gag 100 have cam surfaces cooperating with the ball end 79 of the transsetters 72. The object of these cam surfaces is to move the gags an amount substantially equal to that of the sensing needles 70. In other words, the sensing needles move under no load, other than that of friction and the centralizing spring plungers 89, until the wedges 80 and 81 are in contact; at this time, the sensing carriages and the gag carriage are relatively moving apart and advantage is taken of this movement to use the cams on the bifurcation tines to cause the gags to catch up with the sensing needles; this motion is indicated in Fig. 25 and identified as "Effective for moving gags." After a time, the gags select the corresponding interponent 102 which will not move relative to the gag carriage; and when an appreciable load is about to be applied, then the gags cease relative movement by virtue of the spreading of the said tines of the bifurcate portion of the gags 100; this position is identified in Fig. 25 as "Gag stops." The gags are stationary for about the first 60° of movement of the main shaft, they move through about the next 60° of the main shaft rotation, and are stationary for about 120° of movement, when punching, switching, or the like occurs; then they move towards normal for about 60° and are stationary for the remaining 60° of the main shaft.

(4). The cooperation of wedges 80 and 81 extends throughout the entire cycle, except for about 60° each side of the main shaft normal.

(5). The intermittent tape feed occurs in a period of about 60° divided into equal parts on each side of main shaft normal, and is identified in Fig. 25 as "Punched tape feeds" and "Sensed tape feeds."

(6). The main switch, which is used to eliminate excessive sparking from large stacks of contacts, is closed at all times except for a period of about 45° during each cycle when the mechanical part of the switching occurs; this period is indicated by a sector in Fig. 25 as "Power off" for the reverse direction of rotation. It will be recalled that the article "Main switch" describes a pin and slot drive for the cam that operates the main switch to effect this reversal.

(7). If the machine is used as a punch, the punching occurs during a period corresponding to about 60°, which period is about equally divided on each side of the time that the main shaft is 180° from normal; this period includes the contacting of the tape, the actual operation of forming a perforation, the withdrawal of the punch, and the consequent freeing of the tape from the punches; this period is indicated in Fig. 25 by the caption "Punching chamber."

(8). The feeding of a newly punched tape occurs at the same time, and is of the same duration as the feeding of the tape in the sensing chamber, and has already been identified hereinabove.

(9). If the machine is used for printing or embossing, the time corresponds to about 20° which is equally divided on each side of the main shaft position at 180° from normal.

The timing of the differing machines disclosed herein differs in only minute details, and for the most part these differences are due to the lengths of the interponents 102 (see Fig. 9).

The control of the machines described herein is of the most elementary type; there is no particular need for a generalized form of the "Idempotent units" which are so necessary in the more complete Kalkulex machines. First, the evaluator need not actually be mechanically engaged and disengaged, for it is electrically actuated. The main switch does partake of a form of "Control mechanism," for it corresponds to an electrical engagement and disengagement of the electrical evaluator.

THE GOVERNED MACHINE TOOL

The machine tool which is controlled by the perforated tape devices described herein is shown in highly conventionalized form in Figures 23 and 24 where a portion thereof appears as a conventionalized screw directly connected to the rotary part of a conventionalized selsyn. The great majority of more or less general purpose machine tools are provided with one or more lead screws (or an equivalent thereof) for locating the cutting tool relative to the work operated upon. As a specific example, a simple lathe usually has the work swung between the centers of the head stock and tail stock, and the cutting tool (often called the bit) is mounted in the tool post, which in turn is mounted on a slide, and the said slide is mounted on the carriage. Usually, there is a lead screw mounted on the carriage for optionally adjusting the said tool-post-carrying slide, and the said carriage is optionally adjusted by the lead screw of the lathe. It is to be understood that the conventionalized screws shown in Figures 23 and 24 may be either of these screws or their equivalents. Again, the usual milling machine is provided with lead screws for longitudinally moving the table, another lead screw is provided for transversely moving the said table, and another lead screw is provided for elevating and lowering the table. It is to be understood that the said conventionalized screws in Figures 23 and 24 may be any one of these lead screws. Planers, profilers, boring mills, etc., are likewise provided with lead screws; therefore, the said conventionalized screws of Figures 23 and 24 may be properly regarded as any one of the usual lead screws to be found on any suitable machine tool. Nor is this all, many of the cited machines are provided with the so-called indexing screws or worms, or with screws or worms for tilting a table, a saddle, etc. It is also to be understood that the conventionalized screws of Figures 23 and 24 may be representative of any of these screws or worms.

Under the headings "Evaluator" and "Tape," it was stated that there may be an optional number of independent controlling columns on the tape and that there is an evaluator for each column. It therefore follows that the conventionalized screws of Figures 23 and 24 are representative of any desired number of such lead screws or indexing worms, etc. As a specific example, there are milling machines provided with longitudinal, transversing, and elevating screws, and in addition thereto, more or less similar devices for relatively tilting each of the mentioned motions. Therefore, a tape containing six columns of controlling perforations may govern each of the six mentioned lead screws, worms, etc. It is therefore seen that the automatic perforated tape controls described herein are admirably adapted to automatically control any or all of the usual functions of substantially any machine tool.

Although the screws shown in Figures 23 and 24 are schematically shown as directly connected to the selsyn rotor, in practice there is a suitable reducing gear between the selsyn and screw. In practice, the rotational reduction is about 100 to 1, so that $\frac{1}{16}$ rotation of the selsyn rotor moves the nut on the screw an amount approxiating 0.002 inch, or other amount of comparable length.

MACHINE TOOL RESPONSE

The operation of a selsyn motor acting as part of an electrical evaluator in response to the sensing of perforations in a tape has been described. It now remains to describe the response of a typical machine tool feed and the effects on the contour being generated. If the electrical circuit contained reactance, and the machine tool contained no resilience, there would be an instantaneous response at the cutter for each sensing on the tape. In many respects, these impossibly ideal conditions cannot be attained in practice; nevertheless, this sort of theoretical arrangement furnishes an excellent foundation for analyzing the response of a machine tool. After analyzing the theoretical ideal, it will be easy to pass to the practical constructions.

Figure 28:
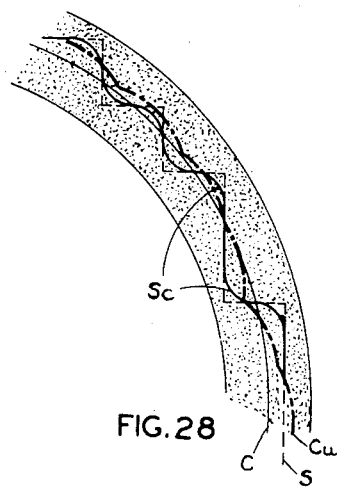
Fig. 28 is a fragment of a contour generated by a machine tool with the control mechanism disclosed herein, the said contour being very highly magnified so as to show characteristics not apparent except under a magnifying lens.

For the sake of illustration, let it be assumed that it is required to generate a contour with an accuracy of ±0.002 inch. A highly magnified fragment of such a contour without tolerance appears as C in Fig. 28. The contour C is shown as a smooth curve at the center of a highly stippled area between two parallel curves. The width of the stippled streak is supposed to be 0.004 inch; that is the width of the given tolerance. According to the data, the generated contour will pass inspection if it is always within the stippled belt or zone. Suppose the distance between consecutive sets of perforations has the value 0.002 inch. A "stairway" composed of risers 0.002 inch height and tread (or aliquot multiples thereof) is indicated as S. The stairway S lies inside the stippled band. Therefore, in accordance with the accuracy limits given, a contour having the shape of the stairway will pass inspection. Further, the stairway S corresponds to instantaneous jumps for consecutive lead screw feeds by the evaluators. This is the sort of contour that would be obtained if a cutting tool could get into the sharp corners and if there were no reactive or resilient effects. This condition can be roughly approximated if the cutter is replaced by a scriber which will make a light line. Observation under a medium power microscope of such a scribed line has about the appearance of the line Sc. It will be noted that the sharp corners of the stairway have been rounded off very noticeably, and further, the line Sc will also pass inspection. Indeed, it has a considerably better appearance than the stairway S.

When cutting steel, both inertia and resistance effects show up very prominently. Under these conditions, the generated contour has the appearance of Cu. A close inspection of the curve Cu shows that it markedly resembles the usual surface contour of a surface generated by a milling cutter. Repeated examination of many samples led to the conclusion that the scalloped effect is due to the method of control and to the inherent errors in the machine tool leads rather than to the usual cutter scallops, for separate pieces are very exact duplicates, including all scallop ridges. Needless to say, Cu has a much better appearance than any of the other curves, and it approaches the ideal exceedingly well within the limits of inspection. Again, if the inherent lost motion in the machine tool is "taken up" as much as reasonably possible, the contour Cu is even better than shown in Fig. 28. A few instances of such elimination of the inherent backlash show that the slight cusps Cu are visible only under fairly high magnification of a compound microscope, and even then it is uncertain whether cusps really appear or whether it is mere raggedness of the cut (perhaps due to chatter of the cutter). It is estimated that the height of the cusps is at most about the depth of the striations found in ordinary grinding. The raggedness due to the hogging of the cutter is so great that the said cusps seem to be entirely obscured.

OSCILLATIONS

The mechanism fully described herein must be substantially free of oscillation in both the electrical and mechanical parts, or the oscillations must be confined to network meshes where they are innocuous to the proper functioning of the machine tool. The theory of oscillations in purely linear circuits is well known, and this is true whether the circuits are purely electrical or purely mechanical, or a combined electrical and mechanical network. It is usually supposed that a mere dissipative element suffices to quench undesirable transient oscillations. This is often true. Another method of eliminating oscillations is set forth at some length in the cited Canadian application S.N. 471,228. The method used herein is an approximate intermediate between that fully explained and described in the last cited application for patent and the well known method of introducing damping elements. It will be recalled that under the article "Evaluator," it was poined out that circulating currents exist between the windings of certain transformers. These circulating currents are, in part, localized oscillations which do not appreciably affect the selsyn motors. It will also be recalled that the selsyns are connected to a lead screw of a machine tool.

Ordinarily, such lead screws are liberally supplied with power dissipative elements in the form of mechanical friction. This frictional resistance is reasonably uniform, and, when the tool is operated idly, it corresponds to a very few foot pounds (e.g., 1 to 3) and comprises only a light load for the selsyn (e.g., $\frac{1}{10}$ to $\frac{1}{3}$ of the recommended continuous displacement). This friction is very effective in quenching selsyn oscillations. It is therefore necessary to design the transformers so that the reactances are such that a portion of the oscillations occasioned by the switching mechanism are, at least partially, absorbed in meshes common to the transformers. The calculation of the requisite reactances is unavoidably long and tedious. However, if an approximate value is obtained, it is possible to obtain better results by a little judicious experimentation. According to such experimentation, the following values have been found to be satisfactory:

(1) The resistance of the transformers is low compared with the selsyn windings to which they are connected (e.g., $\frac{1}{2}$ to $\frac{1}{5}$).

(2) The leakage of the transformers must be small as compared to the selsyn leakages. This result is readily enough attained by using either shell or core type laminations for the said transformers, which are assembled in the usual way.

(3) The iron reluctance of the transformers is relatively large as compared with the corresponding selsyn iron reluctance. In other words, the length of the iron path in the transformers is considerably longer than the iron path in the selsyns (e.g., $1\frac{1}{2}$ to 4 times).

Repeated experimentation wtih a scriber substituted for a cutting tool has shown no oscillations exceeding a few ten-thousandths of an inch in amplitude. It should be kept in mind that the said adjustments of the reactance of the circuit matches the frictional load on the lead screws. If this friction is removed, it is very easy to cause them to "run away." From the foregoing, it is readily seen that proper operation involves a proper match of both the mechanical and electrical impedances with certain simple relative iron reluctance ratios.

MANUAL PUNCH AND COUNTING PUNCH

Figure 32:
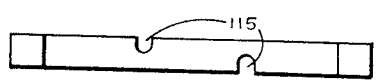
Fig. 32 is a diagrammatic view of a notched slide corresponding to a set of perforations which is used in the manual punch or in the counting punch instead of a previously punched tape.

In the foregoing specification, no distinction has been drawn between the duplicating punch and the senser other than the mere change of the interponents 102 and the presence or absence of the switch-actuating mechanism shown at the bottom of Fig. 9 and in Fig. 11. The manual punch and the counting punch differ from the duplicating punch merely in the sensing chamber and parts closely associated therewith. The simplest manual punch is sufficiently shown in Fig. 2. The detailed description of this simple device is most readily approached by recalling the arrangement of a typical tape. Thus referring to the typical tape fragments of Figures 5, 6, and 8 and the detailed description thereof, it will be recalled that the columns on each tape are divided into sets (see particularly the bottom of Fig. 5 and the top of Fig. 6). These sets may be viewed as independent entities; thus the possible perforations in any set are two—the one perforation hereinabove called the object and the other the specter. In Fig. 5, the object perforations (say) are indicated by a full circle with a dot or by a solid black circle; and the corresponding specter perforations are indicated as a dotted circle with a dot therein or by a plain dotted circle respectively. It will also be recalled that a sensing mechanism senses an object perforation or it senses a specter perforation; therefore, either of the possible sensings may be determined by a slide having about the width of one of said sets, where each slide is provided with two perforations, the one corresponding to the object perforation and the other corresponding to the specter perforation. In order to meet the requirement that one and only one of the perforations may be sensed, the object perforation may have a location corresponding to a full circle with a central dot and the specter perforation may have a location corresponding to a dotted circle. With this particular arrangement, when the supposed slide is positioned so that the object perforation is located for sensing, then the specter perforation will not be in sensing position, and vice versa. It is to be understood that there are other possible locations for the object and specter perforations in the supposed slide than that specifically described, so long as only one of them can be positioned for sensing. From the foregoing, it is apparent that each of the said slides corresponding to each set may be a very simple notched bar as shown in Fig. 32 where the two notches 115 correspond to the described object position and the specter position. It will be recalled that the sensing chamber is very shallow for it has a depth (i.e., distance between the upper and lower plates $a$ as shown in Figures 12 and 13) which is a small multiple of the thickness of the tape. It is conceivable that the slides 116 of Fig. 32 have about the thickness of the tape; but for practical reasons, it is desirable to make them much thicker and thus correspondingly increase the depth of the sensing chamber as indicated in Fig. 2. From the foregoing, it is apparent that the slides 116 of Fig. 2 may be properly manipulated manually to obtain any desired arrangement of perforations. This arrangement is often useful for perforating short fragments of a tape which will later be patched into a tape to be duplicated with the duplicating punch. Furthermore, this simple arrangement forms the basic device for constructing more advanced types of punches.

In the description of the tape, it was stated that, usually, the perforations in each column are essentially mere sequences of the types shown in Figures 6 and 8. It therefore follows that a manual punch may be elaborated by attaching a sequence cam (or combination of cams) for generating such sequences. Such an arrangement is shown schematically at 117 in Fig. 4. In the said Fig. 4, the sequential cams are schematically shown as contacting with the slides 116, and the said slides 116 are tacitly assumed to be resiliently urged against the said sequential cams, so that a proper step-by-step turning of the said cams will result in a corresponding sequence which will be sensed by the sensing mechanism of the punch. This arrangement is useful for perforating tape fragments which may be patched into a tape to be used with the duplicating punch.

Again, it sometimes happens that a tape comprises fairly long sequences of the types shown in Figures 6 and 8. It is therefore sometimes desirable to arrange the sequential cams 117 so that they will be automatically driven by the main operating mechanism of the punch. Such an arrangement is schematically shown in Fig. 4 at 120. This arrangement is substantially the same as that described in the preceding paragraph except that the step-by-step motion is obtained by the gear train 121. One end of the mentioned gear train begins with one of the tape feed shafts 61, which in turn is driven through a Geneva train (see Fig. 11), thus obtaining a suitable step of movement of the sequential cam assembly for each full rotation of the main shaft.

It is to be understood that the said gear train 121 may be of the change gear type so that the cam assembly may move at any desired speed relative to the shaft 61. In this case, it is usually desirable to arrange a known form of "snap action" (not shown) such as that commonly used in electrical switches for suddenly moving the cam assembly to the next position, thus always ensuring the proper positions for the slides 116. Only one automatic cam driving train is shown in Fig. 4, but it is to be understood that there may be a similar arrangement at each end of each shaft 61.

It is also to be understood that each of the sequential cam assemblies 117 may be driven by a selsyn operating in parallel with the selsyns of either Fig. 23 or 24 so that a tape may be duplicated as an incident to the control of the machine tool.

It is to be understood that the arrangements shown in Fig. 4 are merely schematic. None of the details of construction such as shaft supports, springs, or the like are specifically shown. Each can be employed by anyone skilled in the art.

MISCELLANEOUS

Occasionally, it is desirable to open a tape chamber, as for example, for inspection, cleaning, or the like. It is desirable to do this opening with a minimum disturbance of the adjustments of the assembled parts. This can be effected by the use of short stout springs located at judicious places. One mode of effecting such an object is shown in Fig. 26. It should be recalled from the article "Framework" that the entire frame of the machine splits through the tape chamber and that the frame elements are held together by dowel bolts $f$. When the said dowel bolts are loosened, the short stout springs separate the frame through the tape chamber. This construction is useful for facilitating the removal of accumulations of dust or other foreign matter from the elements in the tape chamber. When a tape is old and worn, it may part in the tape chamber, and there may be an accumulation of small tape fragments therein. The described construction facilitates the removal of such debris. Again, it may be desirable to test a portion of a tape which is considerably removed from either end. If the tape chamber is opened as described, the tape can be rapidly drawn through the tape chamber until the desired portion is reached, then closed for operation, then the normal method of operation may be resumed.

Occasionally, it may be desired to temporarily disengage the sensing carriage from the main operating shaft. Obviously, this can best be done by removing the pintles from the block 92. The pitman 19 which reciprocates the gag carriage 20 may be provided with a suitably shaped opening to facilitate the removal of the pintles from the block 92.

At times, it may be desirable to remove the switching mechanism of a senser and replace it with a punching mechanism. This can be readily accomplished by removing the dowel bolts $g$. Such removal permits the removal of the switching mechanism as a whole so that some other desired assembly may replace it.

Sometimes, it may be desirable to remove the looper from a senser. This may be accomplished by removing the rods or bolts $k$ which hold the looper to the main bearing blocks as has been more fully described under the heading looper.

There are many thin sheet metal parts in the machines described herein. These parts include the thin plates integral with the sensing pins 70, the rocker arms 72, the gags 100, etc. Many of these parts have relative movements, and most of them have very loose fits. It is a common mechanical expedient to shape such parts so that none of them can accidentally meet edge-on and thus effect an interference. This common mechanical expedient amounts to requiring that parts that are sometimes wholly or partially interleaved always remain at least partially interleaved, regardless of their relative motions. Again, parts that might have projections that may interfere (e.g., reduction gears or the like) are made slightly thinner at their peripheries to avoid interference. None of these more or less obvious expedients are more specifically described herein. Nevertheless, it is to be assumed that these familiar expedients have been properly incorporated into the machines where they are either necessary or desirable.

At times, it may be desirable to cause the selsyn mechanisms to travel always in a given direction with respect to the tape. In the normal operation of the senser, it may be said for the sake of definiteness that the cutter travels into the work forwardly when the tape is fed forwardly. Normally, the cutter will travel into the work backwardly when the direction feeding of the tape is reversed. The cutter can be made to travel forwardly even when the tape is reversed, by reversing a pair of the three phase leads of one of the selsyns when the direction of the tape feed is reversed. Such a reversing switch is schematically shown in Fig. 24 at PR.

If desired, the above mentioned reversing switch may be incorporated into the switch used for reversing the direction of the senser motor rotation for rereeling the tape. Such an arrangement is shown in Figures 14 and 15 where the switch PR is controlled by the collar 120. It is to be understod that there may be a phase-interchanging switch for each selsyn and that all of these phase interchangers may be operated by the longitudinal movement of the shaft 51, thus automatically effecting the desired circuital changes to have a single direction of travel for the cutter regardless of the reversal of the direction of travel of the tape through the senser. Some shops believe that a milling cutter should always "climb mill"—other shops believe that a milling cutter should always "scrape mill"; these two terms are mere shop jargon for the relative direction of the cutter rotation with respect to the direction of feeding the blank into the cutter. The above described switching mechanism is for the purpose of catering to these shop styles. It is seen from the foregoing that the mechanism may be adjusted by operating suitable switches to accord to either style. It is also to be understood that a separate manual switch can be inserted into the circuit for interchanging phases so that one can change from climb milling to scrape milling, or vice versa, as may be desired.

No chip pan has been shown in connection with the punches. Such pans are optional—to omit them merely means that the immediate vicinity of the punch is likely to be more or less littered with chips. It is to be understood that any suitable receptacle may be provided.

I claim:

1. In a device of the class described a perforated tape having a plurality of series of feeding perforations and means for progressively feeding said tape comprising a pair of plates between which the tape is adapted to pass, a plurality of sprockets for each series of feeding perforations so arranged and located that the teeth of said sprockets engage with said feeding perforations to positively feed the tape in a predetermined direction between the said plates, a roll for each sprocket arranged for sprocket tooth clearance, the construction and arrangement being such that the line of centers of each sprocket and cooperating roll is substantially perpendicular to the tape between said plates, resilient means for causing each sprocket and cooperating roll to grip the tape, doctor blades associated with each sprocket and roll for guarding against adherence of the tape to either the sprocket or roll on the egress side and for guiding the tape to a position corresponding to substantially the common tangent of sprocket and cooperating roll on the ingress side and means for simultaneously, positively driving all of said sprockets substantially as described.

2. In a device of the class described for handling tapes, the combination of supply and storage reels; a looper comprising a plurality of uniformly driven feeding drums for unreeling tape from a supply reel against a predetermined tension on said tape and for supplying tape to a storage roll, the construction and arrangement being such that one of said plurality of feeding drums serves as a drive mechanism for supplying tension to a supply reel and take-up loop of tape comprising a plurality of pairs of sprockets and cooperating rolls which are intermittently driven for rapidly decreasing the supply loop and for coincidentally increasing the take-up loop; means including a shaft for furnishing the uniform drive for said feeding drums and the intermittent drive for the said plurality of sprockets and rolls; and means, including an optionally operable manipulative device for interchanging the functions of said storage reels and supply reel becomes the storage reel.

3. An electromechanical evaluator comprising a power source; a plurality of tapped transformers; a selsyn; a plurality of sets of switches; and suitable electrical connections joining said power source, said transformer, said selsyn, and said sets of switches so that $2^n$ different classes of circuits to the selsyn terminals may be established to the terminals of said selsyn where $n$ is a predetermined digit and also the number of sets of said sets of switches; the construction and arrangement being such that each class of circuits causes the relatively movable elements of said selsyn to assume predetermined relative positions so that there are a total of $2^n$ of said predetermined relative positions of said relatively movable elements of said selsyn, and further said $2^n$ relative positions may be arranged as sequence of $2^n$ substantially integral multiples of a predetermined angle.

4. An electromechanical evaluator comprising a power source; a plurality of tapped transformers; a selsyn; a plurality of sets of switches; and suitable electrical connections joining said power source, said transformer, said selsyn, and said sets of switches so that $2^n$ different classes of circuits to the selsyn terminals may be established to the terminals of said selsyn where $n$ is a predetermined digit and also the number of sets of said sets of switches; the construction and arrangement being such that each class of circuits causes the relatively movable elements of said selsyn to assume predetermined relative positions so that there are a total of $2^n$ of said predetermined relative positions of said relatively movable elements of said selsyn, and further said $2^n$ relative positions may be arranged as sequence of $2^n$ substantially integral multiples of a predetermined angle and the proportioning of the cores and windings of said transformers relative to the magnetic constants and mechanical load of said selsyn is such that mechanical oscillations between relatively movable parts of said selsyn are substantially inconsequential.

5. In a device for feeding and sensing a record having indicia and feeding perforations, the combination of a sensing chamber comprising a pair of plates with an opening between them having a suitable size to permit a free and unobstructed passage of a suitable record therethrough; a plurality of pairs of matched openings in said plates corresponding to all possible locations of indicia; a corresponding plurality of pairs of sensing elements for each possible indicia; a plurality of suitably constructed openings in said plates for pairs of cooperating record feeding sprockets therein which cooperate with said feeding perforations; and a main drive shaft for positively feeding said record through said opening and for drawing said pairs of sensing elements through an evener for each pair of sensing elements.

6. A device according to claim 5 wherein the construction and arrangement being such that there is always an indicia on the record to be sensed by one and only one of said sensing elements of each of said pairs of sensing elements.

7. A device according to claim 5 wherein the construction and arrangement being such that one sprocket of each of said pairs of feeding sprockets is constructed in two theoretical stages of manufacture where the first of said stages consists of providing said sprocket with teeth having a predetermined theoretrically suitable odontoid and the second stage of said stages consists in reducing the addendum of said sprocket a predetermined amount to effect a suitable clearance.

8. A device according to claim 5 wherein the construction and arrangement being such that each hole of said pairs of holes is provided with an entrance into the said opening between the said pairs of plates which gradually merges into the surfaces of said opening whereby any projecting irregularities at the periphery of an indicia on said record is constrained to gradually pass into the said opening between the plates.

9. A device according to claim 5 wherein the construction and arrangement being such that one sprocket of each of said pairs of feeding sprockets is constructed in two theoretical stages of manufacture where the first of said stages consists of constructing a sprocket of predetermined tooth form with a cylindrical dedendum and the second stage consists in forming the mentioned dedendum with a clearance completely around each tooth of said sprocket so that the said record is held in position by and only by the sprocket tooth.

References Cited in the file of this patent

UNITED STATES PATENTS

| | | |
|---|---|---|
| 704,484 | Michalke | July 8, 1902 |
| 1,172,058 | Scheyer | Feb. 13, 1916 |
| 1,851,004 | Donaldson | Mar. 29, 1932 |
| 2,029,335 | Oberhoffken | Feb. 4, 1936 |
| 2,092,142 | Schuz | Sept. 7, 1937 |
| 2,142,882 | Benzon | Jan. 3, 1939 |
| 2,213,108 | Pollard | Aug. 27, 1940 |
| 2,283,240 | Trinkle | May 19, 1942 |
| 2,358,746 | Trandler | Sept. 19, 1944 |
| 2,367,568 | Drown | Jan. 16, 1945 |
| 2,475,245 | Leaver | July 5, 1949 |
| 2,484,968 | Sponaugle | Oct. 18, 1949 |